June 18, 1963 R. J. WILLIAMS ETAL 3,094,044

APPARATUS FOR MANUFACTURING BAGS

Filed May 29, 1961 15 Sheets-Sheet 1

Russell J. Williams,
Milton J. Heimos,
Inventors.
Koenig, Pope, Senniger and Powers,
Attorneys.

June 18, 1963 R. J. WILLIAMS ETAL 3,094,044

APPARATUS FOR MANUFACTURING BAGS

Filed May 29, 1961 15 Sheets-Sheet 4

June 18, 1963 R. J. WILLIAMS ETAL 3,094,044

APPARATUS FOR MANUFACTURING BAGS

Filed May 29, 1961 15 Sheets-Sheet 5

June 18, 1963 R. J. WILLIAMS ETAL 3,094,044

APPARATUS FOR MANUFACTURING BAGS

Filed May 29, 1961 15 Sheets-Sheet 6

APPARATUS FOR MANUFACTURING BAGS

June 18, 1963 R. J. WILLIAMS ETAL 3,094,044

APPARATUS FOR MANUFACTURING BAGS

Filed May 29, 1961 15 Sheets-Sheet 8

APPARATUS FOR MANUFACTURING BAGS

June 18, 1963 R. J. WILLIAMS ETAL 3,094,044

APPARATUS FOR MANUFACTURING BAGS

Filed May 29, 1961 15 Sheets-Sheet 14

United States Patent Office 3,094,044

Patented June 18, 1963

1

3,094,044
APPARATUS FOR MANUFACTURING BAGS

Russell J. Williams, Clayton, and Milton J. Heimos, Lemay, Mo., assignors to Bemis Bro. Bag Company, St. Louis, Mo., a corporation of Missouri Filed May 29, 1961, Ser. No. 113,346
28 Claims. (Cl. 93—22)

This invention relates to apparatus for manufacturing bags, and more particularly to a rotary bottomer for forming so-called self-opening square bottoms ("S.O.S." bottoms) on gusseted paper bag tubes.

Among the several objects of this invention may be noted the provision of an improved rotary bottomer for automatically forming S.O.S. bottoms on gusseted paper bag tubes; the provision of a rotary bottomer such as described in which bag tubes are fed endwise to a continuously rotating drum which carries gripper mechanism for opening up one end of each tube to initiate the formation of an S.O.S. bottom at that end of the tube; the provision of a rotary bottomer such as described having means for automatically folding over and pasting the side flaps of the S.O.S. bottom; the provision of a rotary bottomer such as described which is adapted for operation on bag tubes of different widths and gusset sizes and which, when set up to operate on a run of tubes of a given width and gusset size, automatically compensates for variations from means tube dimensions as frequently occur; and the provision of a rotary bottomer such as described which is adapted for high-speed production of bags with S.O.S. bottoms. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 (sheet 1) is a view in elevation of the side of a bottomer constructed in accordance with this invention which is referred to as the left side or operator's side of the bottomer;

2

Figures 1, 20:
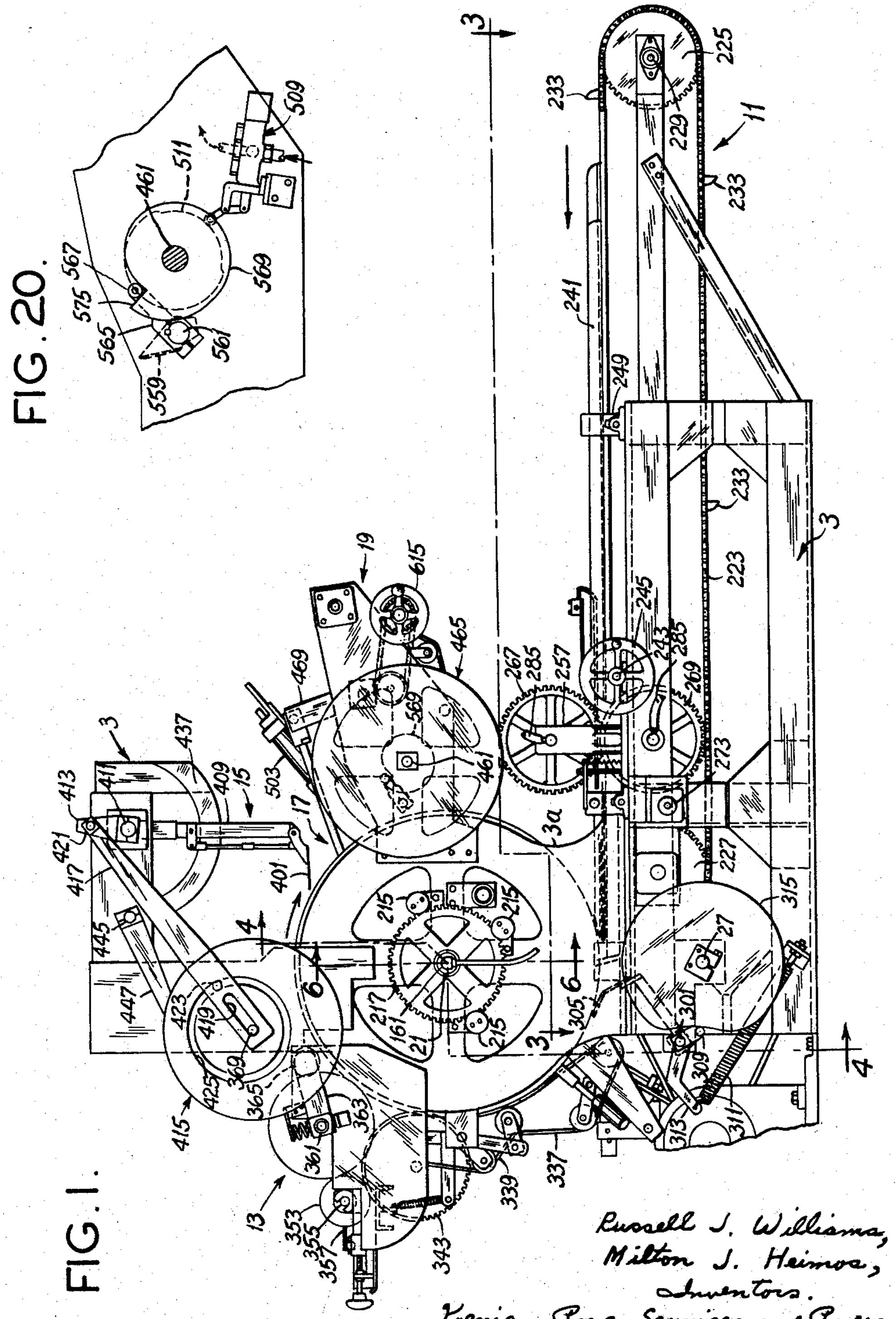
Figures 2, 21:
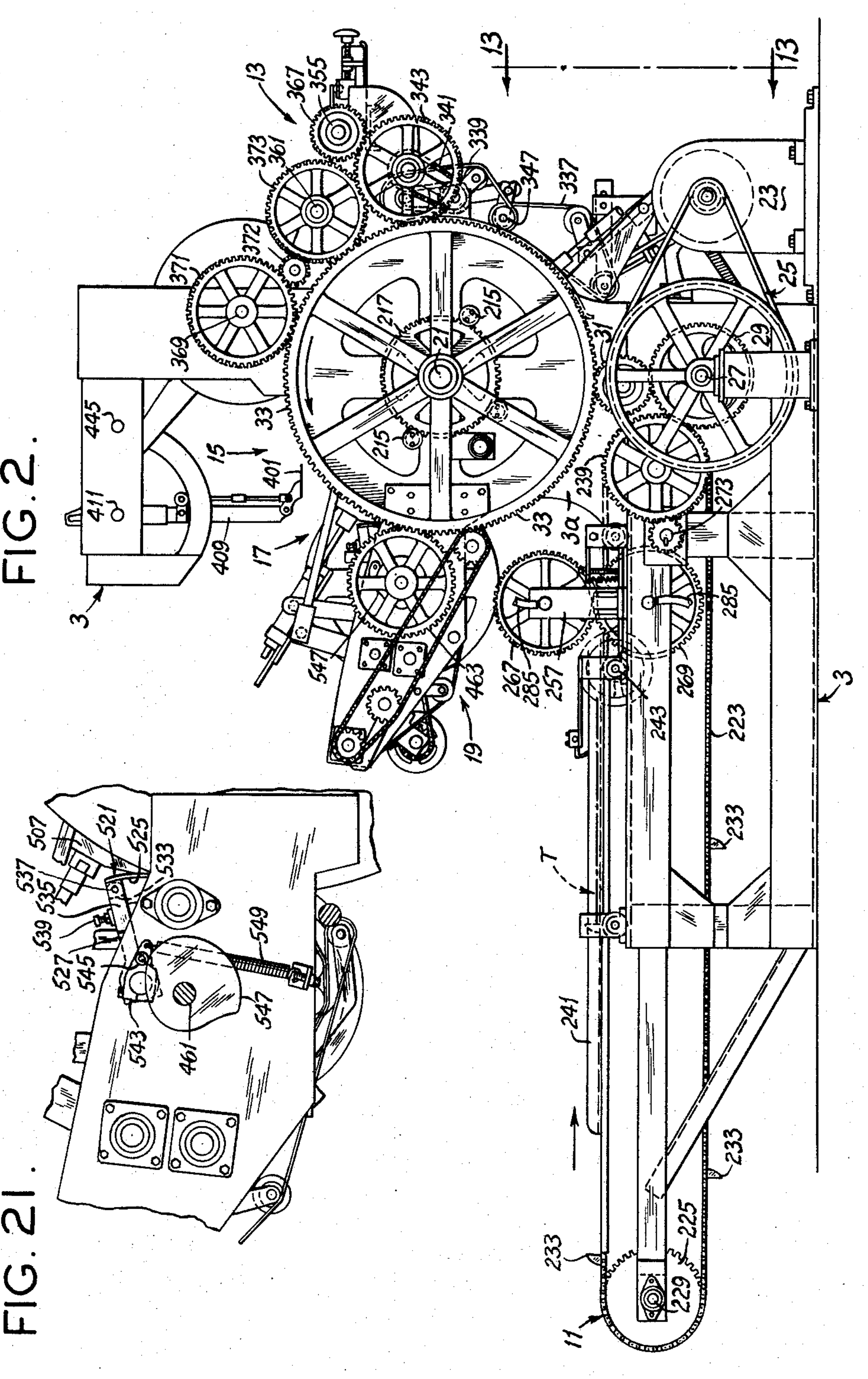
FIG. 2 (sheet 2) is a view in elevation of the other side of the bottomer which is referred to as the right side or drive side of the bottomer.
Figures 7, 18:
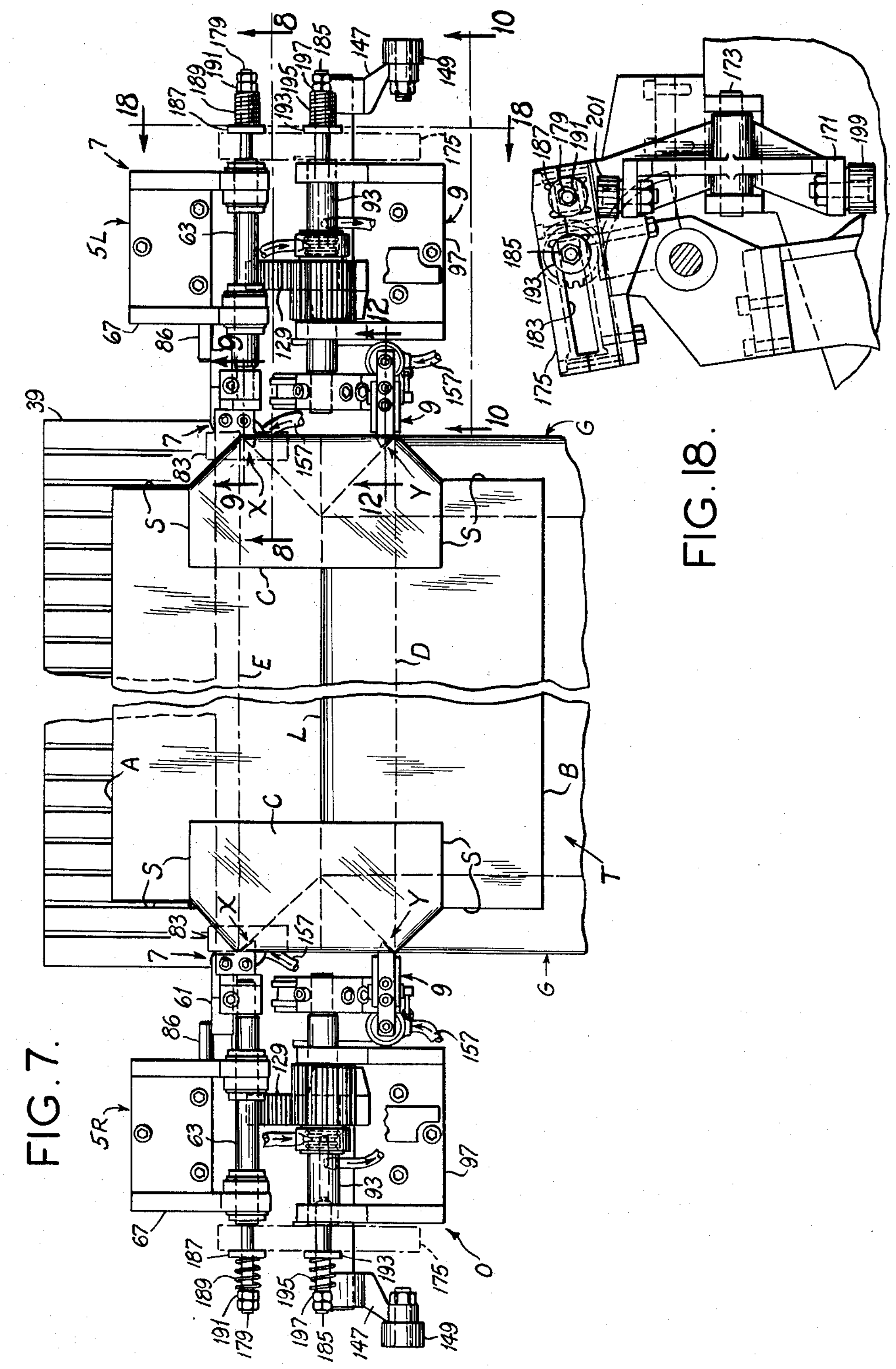
FIG. 7 (sheet 7) is an enlarged view showing the end of a bag tube opened up by certain grippers of the bottomer.
Figure 16:
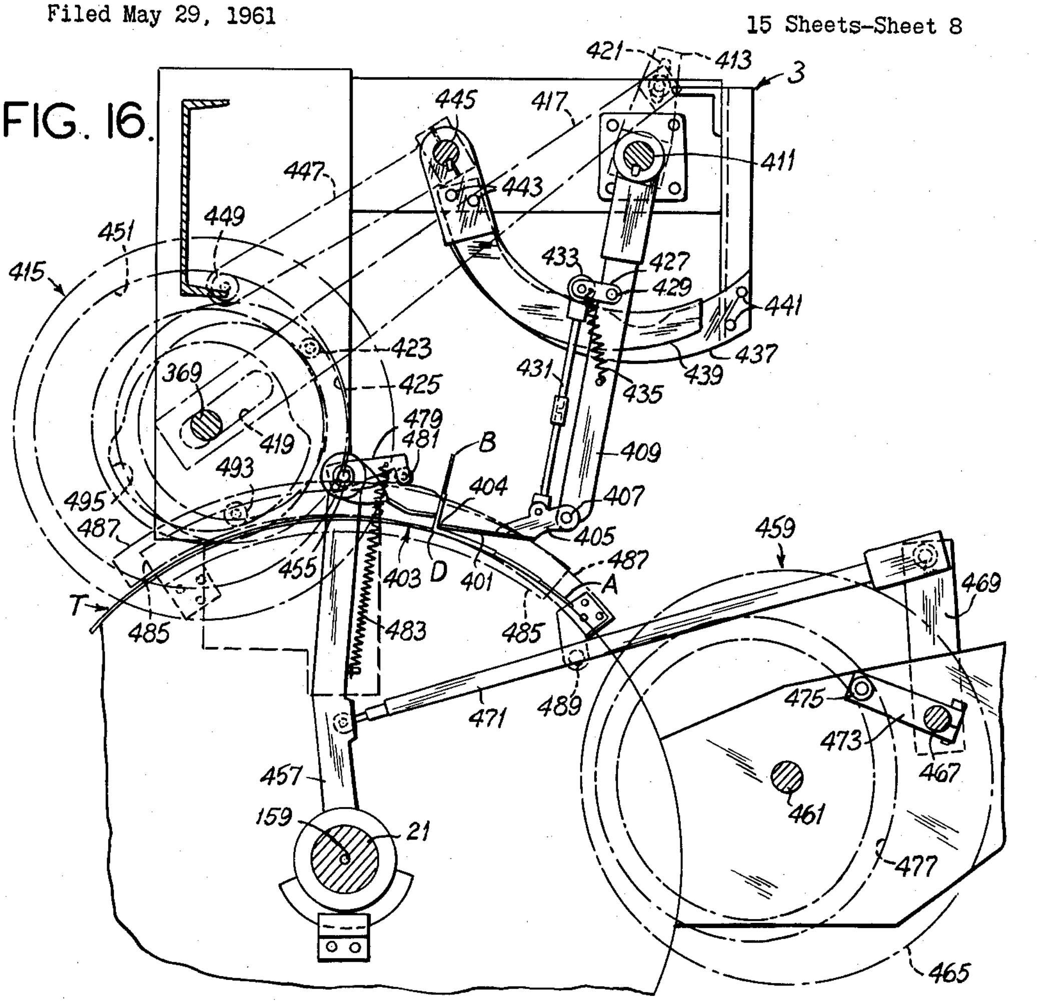
Figure 12:
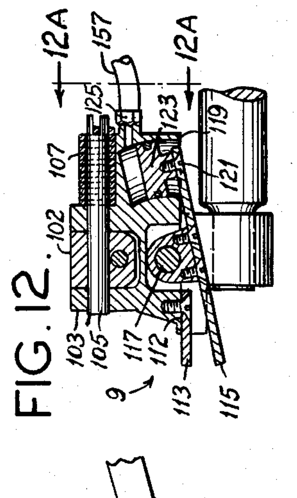
Figure 12A:
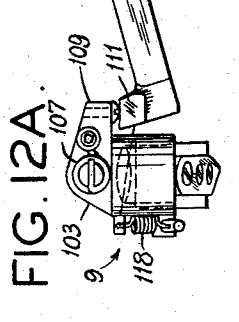
Figure 14:
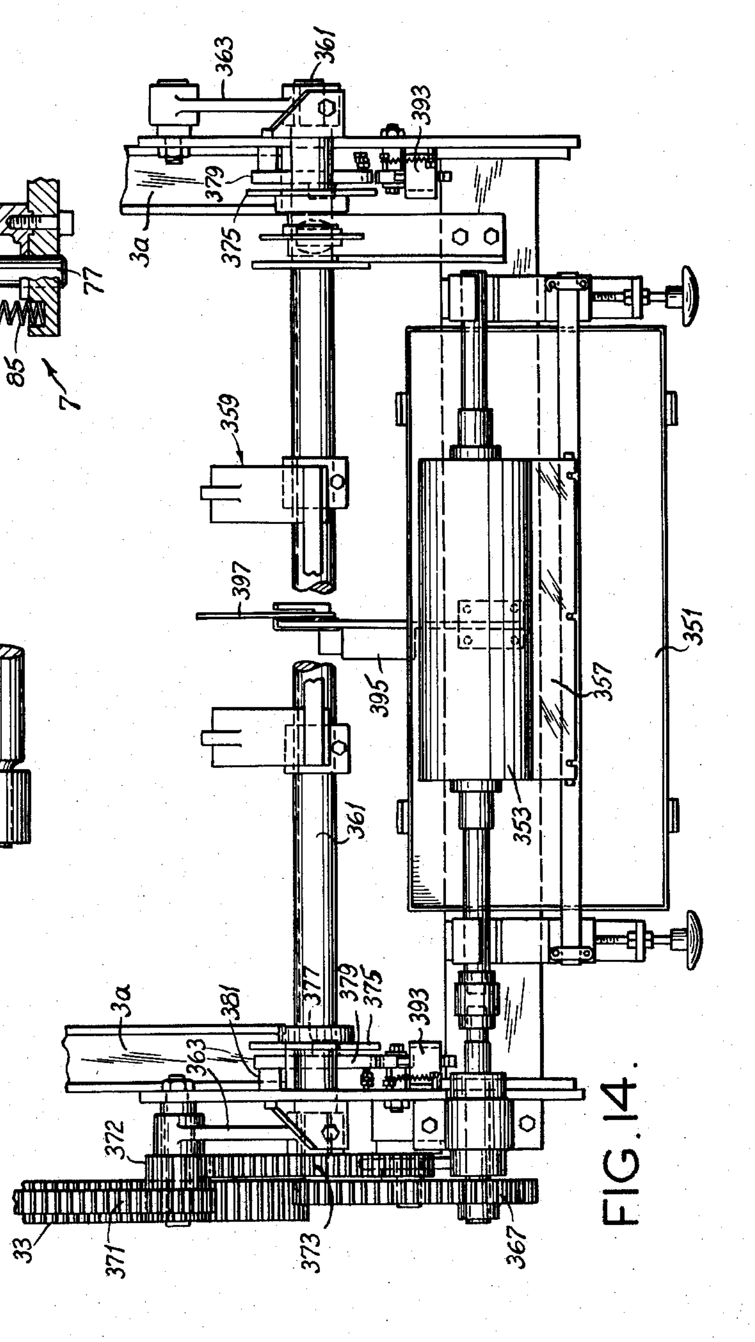
Figure 13:
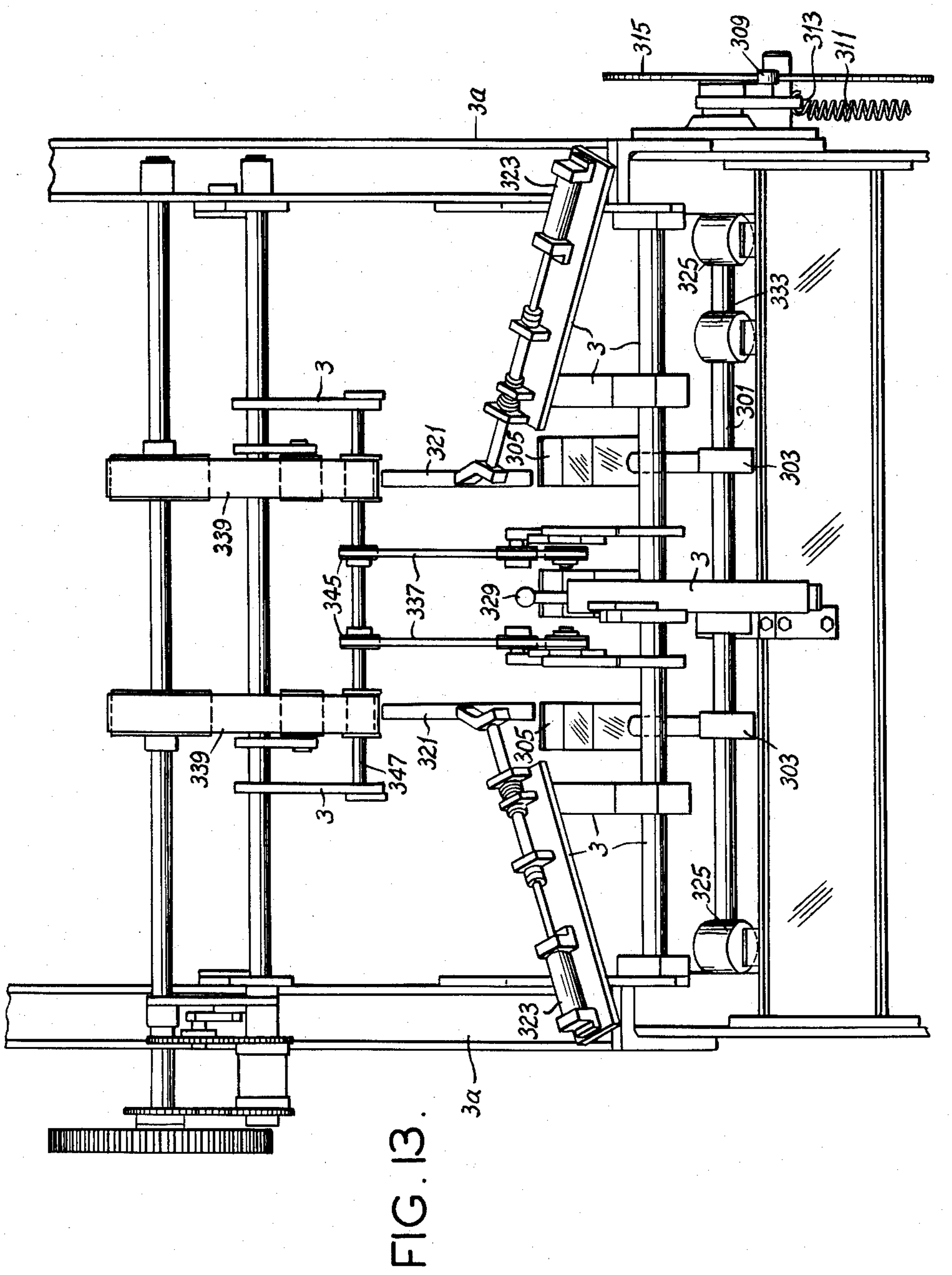
Figure 15:
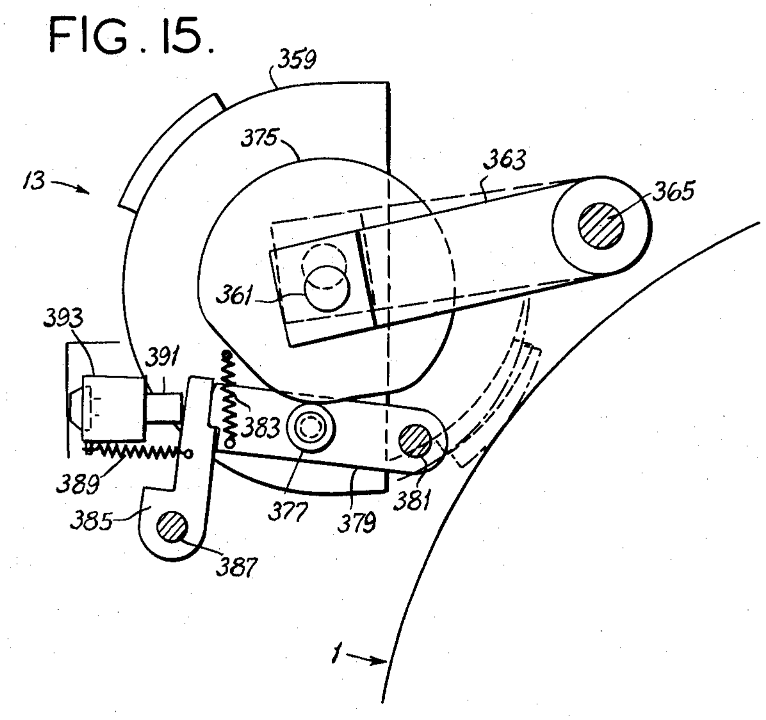
Figure 17:
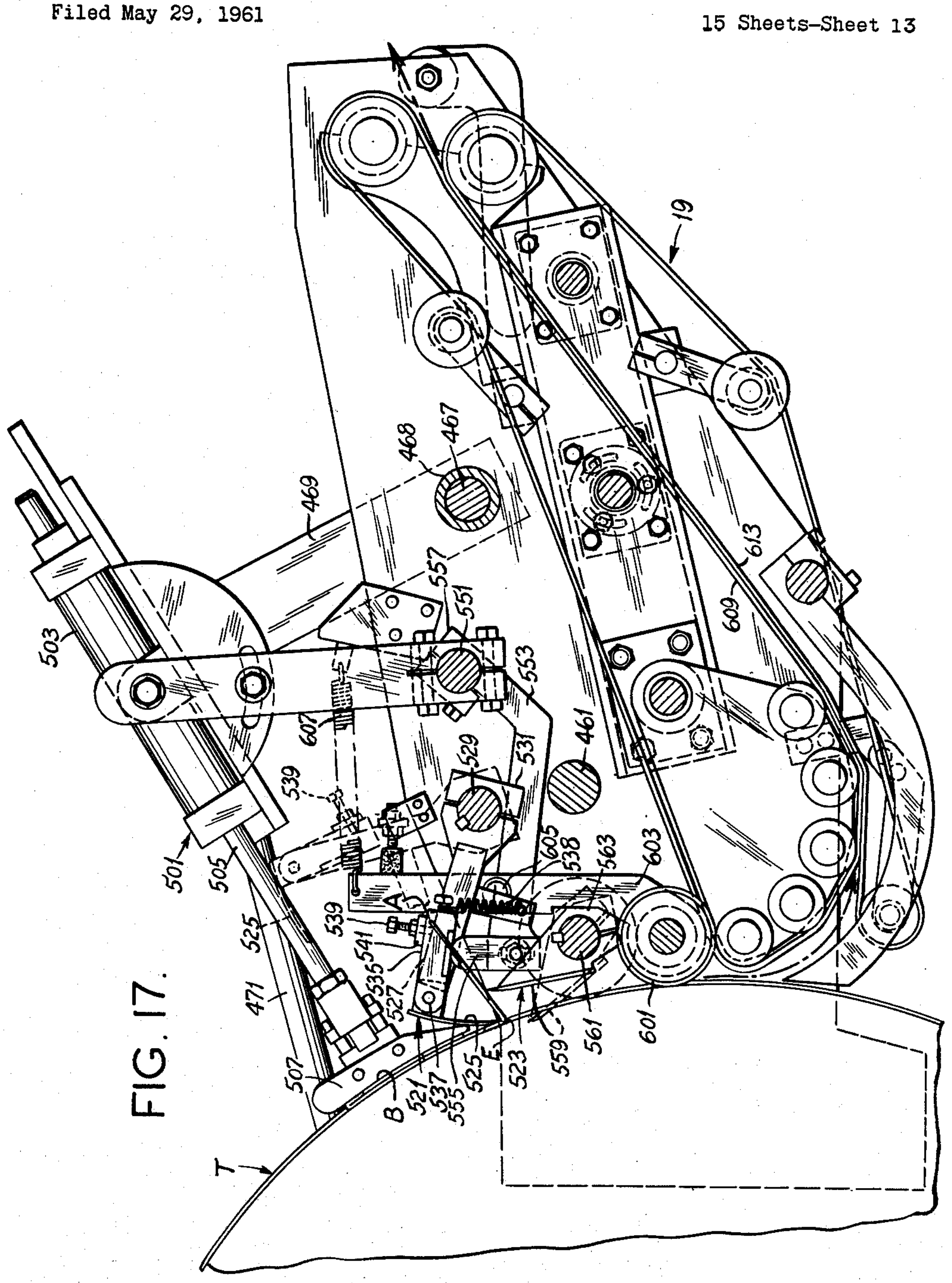
Figure 19:
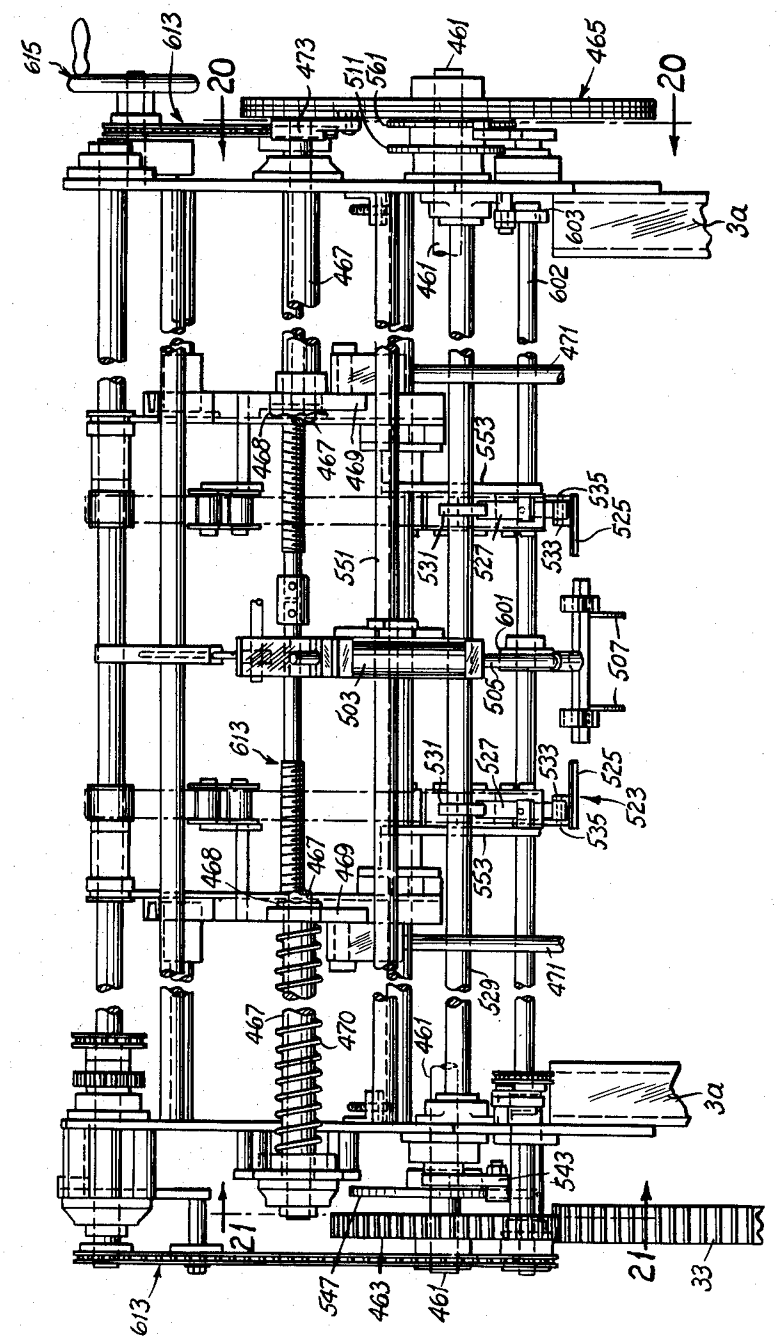

FIG. 12 (sheet 9) is a section taken substantially on line 12—12 of FIG. 7, showing certain details of the pivot gripper, the jaws of the gripper being shown open;

FIG. 12A (sheet 9) is a section taken on line 12A—12A of FIG. 12;

FIG. 13 (sheet 11) is an end elevation taken generally on line 13—13 of FIG. 2;

FIG. 14 (sheet 9) is a plan of certain means for applying paste to the opened-up bottoms of bag tubes;

FIG. 15 (sheet 12) is a view showing certain details of the pasting means;

FIG. 16 (sheet 8) is a longitudinal section showing certain details at a first flap folding station;

FIG. 17 (sheet 13) is a longitudinal section showing certain details of a second flap folding station and a delivery conveyor;

FIG. 18 (sheet 7) is an enlarged section taken substantially on line 18—18 of FIG. 7;

FIG. 19 (sheet 14) is a plan view showing the second flap folding station and the delivery conveyor;

FIG. 20 (sheet 1) is a section taken on line 20—20 of FIG. 19 showing certain details of certain cam mechanism;

FIG. 21 (sheet 2) is a section taken on line 21—21 of FIG. 19 showing certain details of other cam mechanism; and FIGS. 22–27 (sheet 15) are views illustrating the successive steps in the formation of a bottom on a bag tube.

Corresponding reference characters indicate corresponding parts throughout the several views of the drawings.

Referring to the drawings, a rotary bottomer constructed in accordance with this invention is shown to comprise a rotary drum 1 supported by a frame indicated at 3. This drum rotates continuously in clockwise direction as view in FIG. 5 in the operation of the bottomer. It carries three bottom-opening mechanisms, each indicated at O, spaced at 120° intervals around the periphery of the drum, for opening up the leading end of each of a succession of gusseted bag tubes T fed endwise toward the drum (and tangent to the drum at the bottom thereof) to initiate the formation of an S.O.S. bottom at the leading end of each tube T. Each opening mechanism O comprises a pair of gripper units spaced laterally of the drum (on opposite sides of the central longitudinal plane of the bottomer) one such unit of each pair being referred to as the left-hand gripper unit and being designated 5L and the other being referred to as the right-hand gripper unit and being designated 5R. Each of the units 5L and 5R includes a pair of grippers 7 and 9, gripper 7 being a so-called hold-down or stationary gripper, and gripper 9 being a so-called pivot gripper.

Figures 22, 23, 24, 25, 26, 27:
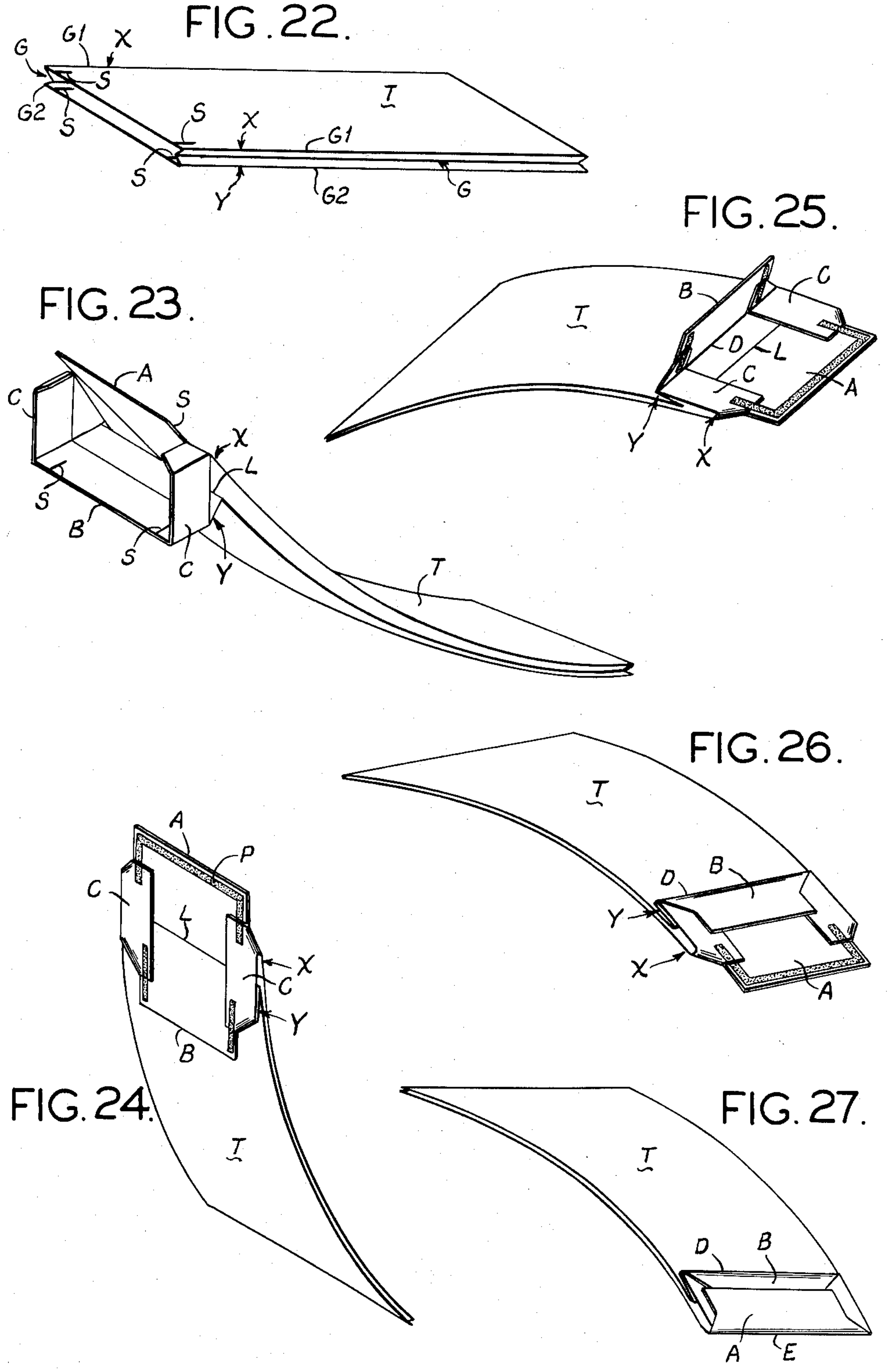

In general, bag tubes T are fed endwise toward the bottom of the drum one after another by a conveyor generally designated 11. Each tube is a gusseted tube, its gussets being indicated at G in FIG. 22. Each gusset comprises folds G1 and G2, the folds G1 being the upper folds as the tubes are fed toward the drum, and folds G2 being the lower folds. Each tube is pre-slit as indicated at S. As each tube is fed toward the drum, its gussets G are spread open as illustrated in FIG. 22 to enable the hold-down grippers 7 of units 5L and 5R of one of the opening mechanisms O to grip the folds G1 of the gussets at points such as indicated at X in FIG. 22 and to enable the pivot grippers 9 of units 5L and 5R of the stated opening mechanism O to grip the folds G2 of the gussets at points such as indicated at Y in FIG. 22. The tube is then carried around with the drum 1, and, as it is carried around with the drum, grippers 7 hold folds G1 in place on the drum, and pivot grippers 9 are swung away from grippers 7 to open up the leading end of the tube T as illustrated in FIG. 23. This opening up of the leading end of the tube involves the folding back (by the action of pivot grippers 9) of a portion of the bottom wall of the tube (which is the radially outer wall of the tube in relation to the drum) on a main fold or crease line L, which results in the formation of a leading bottom flap A, a folded-back trailing bottom flap B, and inwardly directed end flaps C (see FIGS. 23 and 24). As the tube continues its travel with the drum 1, the opened-up bottom formation is flattened and a pattern of paste P is applied (see FIG. 24) at a pasting station generally designated 13 in FIGS. 1, 2 and 5. Following the application of paste, the end of the tube with the opened-up and flattened bottom formation is carried through a first folding station indicated at 15 in FIGS. 1 and 2 where the trailing flap B is folded over on a fold line D (see FIGS. 25 and 26) to form the first side flap of the S.O.S. bottom. Then the end of the tube is carried through a second folding station indicated at 17 in FIGS. 1 and 2 where the leading flap A is folded over on a fold line E to form the second side flap of the S.O.S. bottom overlapping the first side flap B, thereby to complete the S.O.S. bottom (see FIG. 27). Completed bags are carried away by a conveyor 19 and delivered to another conveyor (not shown) which carries them through apparatus for pressing the bottoms and drying the paste.

Figure 3:
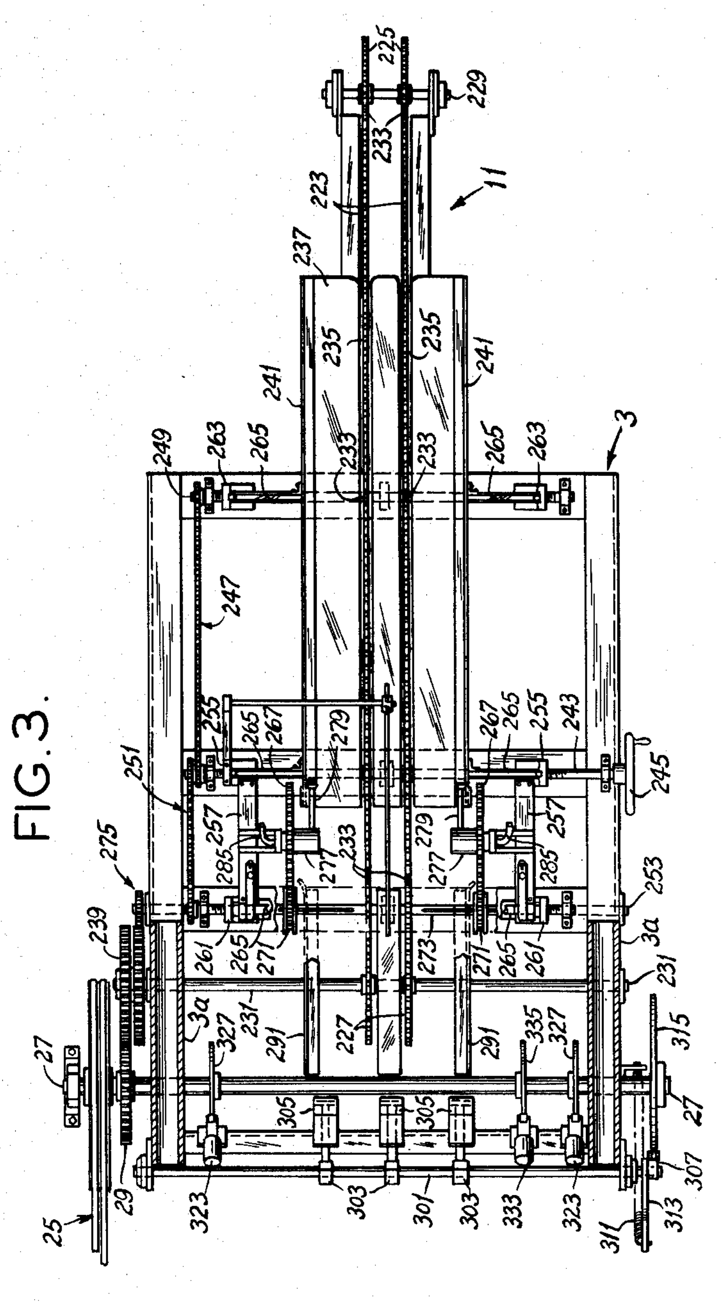
FIG. 3 (sheet 3) is a horizontal section taken substantially on line 3—3 of FIG. 1, with parts broken away.
Figure 5:
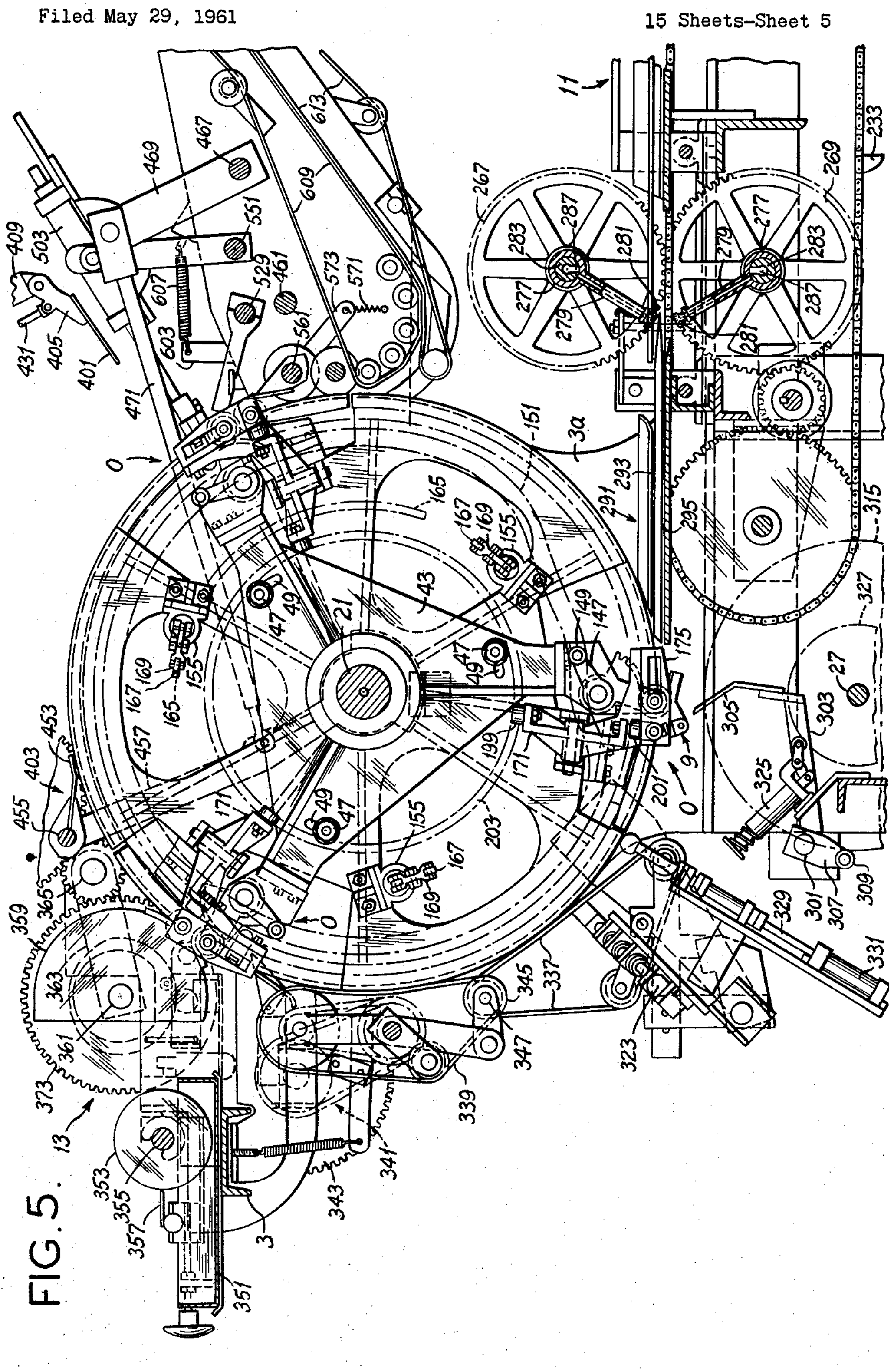
FIG. 5 (sheet 5) is a vertical longitudinal section taken substantially on line 5—5 of FIG. 4.

Conveyor 11 feeds the bag tubes toward the left as viewed in FIGS. 1, 3 and 5 (toward the right as viewed in FIG. 2). The left-hand and right-hand sides of the bottomer are the left-hand and right-hand sides as considered when facing in the direction of tube feed by conveyor 11. Thus, FIG. 1 shows the left-hand side and FIG. 2 shows the right-hand side of the bottomer. The left-hand side is sometimes referred to as the operator's side, and the right-hand side is sometimes referred to as the drive side.

The drum 1 comprises a horizontal shaft 21 extending transversely across the bottomer journalled in suitable bearings in main side members 3*a* of frame 3. The drum is adapted to be driven continuously in clockwise direction as viewed from the left side of the bottomer by a motor-speed reducer unit 23 via a belt and pulley drive 25 to a camshaft 27 located below the drum, and thence via a gear train comprising a gear 29 on the right end of camshaft 27 in mesh with an idler gear 31 at the right side of the bottomer and a larger gear 33 (sometimes referred to as a bull gear) on the right end of the drum shaft 21 in mesh with the idler. Shaft 21 carries a central spider 35 (see FIG. 4) and left and right-hand gripper-supporting spider assemblies each designated 37 (see FIGS. 4 and 6). The latter are of corresponding left and right-hand construction and have corresponding parts which are identified by the same reference characters. The left-hand assembly 37 (shown in FIG. 6) carries the three left-hand gripper units 5L and the right-hand assembly 37 carries the three right-hand gripper units 5R. Assemblies 37 are axially adjustable on shaft 21 for operation on bag tubes of different widths.

The central spider 35, which is fixed on shaft 31, carries three so-called paste back-up blocks 39, each of which extends laterally on opposite sides of the central spider. These blocks are spaced at 120° intervals around the central spider. Each of the two gripper-supporting spider assemblies 37 comprises two spiders 41 and 43, and a disk 45. Clamp screws 47 extend through arcuate slots 49 (see FIG. 5) in spider 43 and are threaded in bosses 51 on the spider 41. Disk 45 is attached to spider 41 as indicated at 53. Spider 41 has a clamp hub 55 for releasably clamping it on the drum shaft 21, thereby releasably clamping assembly 37 on shaft 21. The arrangement is such that by releasing the clamp hub, assembly 37 may be moved axially on shaft 21, and by releasing the screws 47, spider 43 may be rotated relative to spider 41 within the limits of movement of screws 47 in arcuate slots 49. The latter permits angular adjustment of spider 43 relative to spider 41 to enable adjustment for operation on bag tubes with different gusset sizes as will be made clear.

Figure 8:
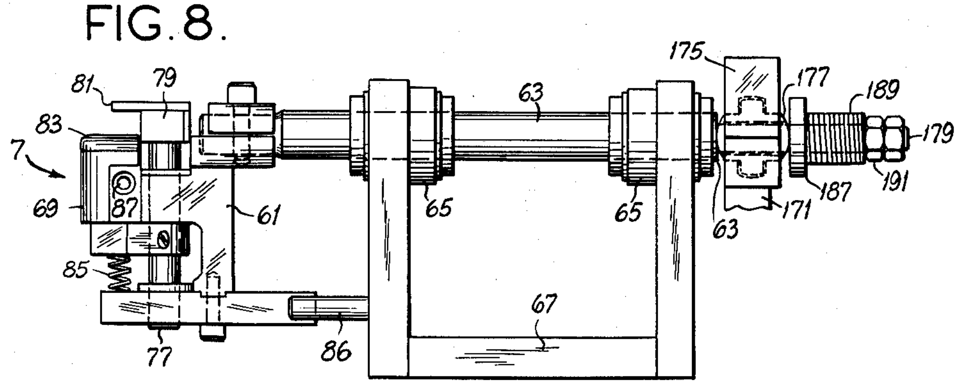
FIG. 8 (sheet 8) is a view taken substantially on line 8—8 of FIG. 7 showing a so-called hold-down gripper per se, and illustrating the jaws of the gripper open.
Figure 9:
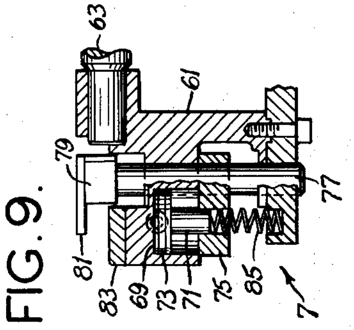
FIG. 9 (sheet 9) is a section taken substantially on line 9—9 of FIG. 7, showing certain details of the hold-down gripper, and illustrating the jaws of the gripper open.

Gripper units 5L and 5R are generally of corresponding left and right-hand construction and have corresponding parts which are identified by the same reference characters. As previously mentioned, each of these units includes a hold-down gripper 7 and a pivot gripper 9. The hold-down gripper 7 comprises a gripper body 61 (see FIGS. 8 and 9) secured on the end of a rod 63 mounted for axial sliding movement in guides 65 in the sides of a U-shaped frame 67. The gripper frames 67 of the three left hand units 5L are mounted on the left-hand spider 41, and the gripper frames of the three right-hand units 5R are mounted on the right-hand spider 41, spaced at 120° intervals. As to each hold-down gripper 7, rod 63 extends parallel to the axis of the drum 1, and the rods 63 of each pair of units 5L and 5R are aligned transversely of the drum, being slidable toward and away from one another in the respective frames 67. Body 61 of each gripper 7 is secured on the inner end of rod 63, and is formed to provide an air cylinder 69, with the axis of this cylinder at right angles to the axis of the rod 63. A piston rod 71 extends from a piston 73 in the cylinder in the direction toward the axis of the drum, and has a connection at 75 with a rod 77 which is carried by the gripper body 61 for sliding movement relative to the body parallel to the cylinder axis. Rod 77 has a head 79 at its outer end carrying a jaw 81 which reaches over a jaw 83 on the outer end of the cylinder. A return spring 85 biases piston 73 and rod 77 to a retracted position wherein jaw 81 is raised from jaw 83 (see FIG. 9). The cylinder has a port 87 for supplying compressed air thereto above piston 73 to drive jaw 81 down (i.e., in the direction toward the drum 1) against the bias of spring 85. Body 61 (and rod 63) are held against rotation (while being free to slide in and out) by a pair of pins 86 on frame 67.

Each pivot gripper 9 comprises an assembly generally designated 91 (see FIGS. 10–12) secured on the end of a shaft 93 mounted for both rotation and axial sliding movement in the sides of a U-shaped frame 97. The pivot gripper frames 97 of the three left-hand units 5L are mounted on the left-hand spider 43, and the pivot gripper frames 97 of the three right-hand units 5R are mounted on the right hand spider 43, spaced at 120° intervals. As to each pair of units 5L and 5R, the pivot gripper frames 97 are located directly trailing the hold-down gripper frames 67, in relation to the direction of rotation of the drum 1 (see FIG. 11). As to each pivot gripper 9, shaft 93 extends parallel to the axis of the drum 1, and the shafts 93 of each pair of units 5L and 5R are aligned transversely of the drum, being slidable toward and away from one another in the respective frames 97. Each assembly 91 comprises an arm 98 mounted for sliding adjustment lengthwise of the arm on a clamp hub 99 clamped on the inner end of the shaft 93. Arm 98 is adapted to be clamped in adjusted position on hub 99 by a bolt 100 threaded in a T-nut 101 (see FIG. 11A). Arm 98 has an offset extension 102. A clevis-shaped gripper body 103 straddles extension 102, and is pivoted thereon as indicated at 105 for swinging movement on an axis parallel to the axis of shaft 93. A coil spring 107 surrounding an extension of pivot 105 biases body 103 to swing to a retracted position determined by engagement of a finger 109 on the body with a stop 111 on extension 102 of arm 98 (see FIG. 12A). Body 103 has a groove 112 extending at right angles to arm 98. A jaw 113 is secured to body 103 at the bottom of the groove and projects out from the body at that end of the groove toward the center spider 35. Cooperable with this fixed jaw 113 is a movable jaw 115 pivoted at 117 on body 103 for swinging movement on an axis spaced from and at right angles to the axis of pivot 105. A spring 118 biases jaw 115 to a retracted position wherein it is raised from jaw 113 (see FIGS. 10 and 12). Body 103 is formed to provide an air cylinder 119 at the outside thereof. Jaw 115 has an extension connected at 121 to a piston 123 in the cylinder. The latter has a port 125 for supplying compressed air thereto to drive jaw 115 down toward fixed jaw 113 against the return bias of spring 118.

A spur gear 127 of sufficient width to accommodate the inward and outward movement of shaft 93 is secured to shaft 93 between the sides of the U-shaped frame 97. A sector gear 129 meshes with gear 127. This sector gear has a hub 131 mounted on a rock shaft 133 journalled in the sides of frame 97. Hub 131 is rotatable relative to shaft 133, but does not slide on shaft 133. Gear 127 is adapted to slide axially with shaft 93 while remaining in mesh with the sector gear. A member 135 is secured on shaft 133 alongside hub 131, and a yieldable spring connection is provided between this member and the hub. This spring connection comprises an eyebolt 137 pin-connected at 138 to the hub and extending through an opening in an arm 135*a* on member 135, and a coil compression spring 139 interposed between arm 135*a* and a nut on the end of the bolt. This provides a yieldable drive connection between member 135 and hub 131, i.e., when shaft 133 and member 135 rotate counterclockwise as viewed in FIG. 11, arm 135*a* acts through the spring 139 on the eyebolt to drag around the hub 131 (and sector gear 129 on the hub). On reverse rotation of shaft 133 and member 135 (clockwise as viewed in FIG. 11) a shoulder 140 on member 135 acts via engagement with a screw 141 carried by hub 131 to rotate the hub and gear 129 clockwise. The sector gear is adapted to swing counterclockwise from the position shown in FIG. 11 to a second angular position determined by engagement of a shoulder 142 on the sector gear hub 131 with a stop screw 143 threaded in a block 145 mounted on the base of frame 97.

Shaft 133 has an arm 147 on its outer end carrying a cam follower roller 149. The rollers 149 of the left-hand units 5L ride in a cam groove 151 in the inside face of a cam plate 153 at the left of the drum 1, and the rollers 149 of the right-hand units 5R ride in an identical cam groove 151 in the inside face of an identical cam plate 153 at the right of the drum. These cam plates are nonrotatable, being carried by the bottomer frame on the inside of side members 3*a* of the bottomer frame, and are adjustable axially inward and outward relative to the drum to different positions for operation on bag tubes of different widths. As will be apparent, cam grooves 151 act via followers 149, levers 147, shafts 133, sector gears 129 and gears 127 to control the angular position of pivot grippers 9 as the latter rotate around with the drum 1. These cam grooves are so developed and phased that each pivot gripper 9 occupies the initial angular position illustrated in FIG. 11 when the gripper is at the bottom of the circle of its travel. In this initial angular position of each related left-hand and right-hand pivot gripper 9, its jaws 113 and 115 are located immediately radially outward of jaws 81 and 83 of the respective hold-down grippers 7. As the pivot grippers 9 are carried around clockwise with drum 1 as viewed in FIG. 5 (counterclockwise as viewed in FIG. 11) from their position at the bottom of the circle of their travel, cam grooves 151 cause the pivot grippers to swing away from their initial angular position of FIG. 11 to the second angular position in which they appear in FIG. 7 trailing the hold-down grippers for the purpose of opening up a bottom to the leading end of the bag tube, the gusset folds of which are gripped by the grippers. The cam grooves 15 maintain the pivot grippers in the stated second angular position (note the position of the two uppermost pivot grippers in FIG. 5) until the pivot grippers again approach the lowermost point of travel, then swing the pivot grippers back to their initial angular position.

The two hold-down grippers 7 and the two pivot grippers 9 of the pair of units 5L and 5R of each of the opening mechanisms O initially occupy a retracted position outward of the sides of a bag tube, and their jaws are open. As each pair of units 5L and 5R comes around with the drum to the bottom point of their travel, the grippers 7 and 9 of the pair of units 5L and 5R are moved inward (toward one another). Jaws 81 and 115 are open at this time so that, when the grippers are moved inward as described in the preceding paragraph, jaws 81 and 83 straddle gusset folds G1 of the bag tube, and jaws 113 and 115 straddle gusset folds G2 of the bag tube at the aforesaid points X and Y. Then, compressed air is supplied to cylinders 69 and 119 of the pair of units 5L and 5R to cause jaws 81 and 115 to close and grip gusset folds G1 and G2. Following the closing of jaws 81 and 115, the pivot grippers 9 are swung open as previously described to open up the end of the bag tube. With the pivot grippers swung open, compressed air is maintained in the cylinders to hold jaws 81 and 115 closed until the grippers have come around with the drum 1 to a position within the first folding station 15. Then cylinders 69 and 119 are vented to allow jaws 81 and 115 to open.

The supply to and venting of air from gripper cylinders 69 and 119 is controlled by cam-operated valves 155 carried by (and rotatable with) the spiders 43 on the outside thereof. There are six such valves, three on the left-hand spider 43 (one for each of the three left-hand units 5L) and three on the right-hand spider 43 (one for each of the three right-hand units 5R). Flexible hose lines such as indicated at 157 connect the valves to the ports of cylinders 69 and 119. The drum shaft 21 is tubular, thereby providing an air manifold 159 (see FIG. 6), supplied with compressed air from a compressor (not shown) via a swivel connection 161. Flexible air hose lines such as indicated at 163 in FIG. 6 connect the manifold 159 to the valves. Each of the cam plates 153 has an arcuate rib 165 fastened thereto constituting a cam for controlling valves 155, each of the latter having a cam follower roller 167 on a valve-actuating lever 169. The arrangement is such that, as to any given pair of units 5L and 5R, cylinders 69 and 119 are supplied with compressed air immediately after the grippers 7 and 9 of these units have moved laterally inward, thereby to cause the jaws 81 and 115 to close and grip the gusset folds of a bag tube. Jaws 81 and 115 are maintained closed until the bag tube has been carried around through station 17, then cylinders 69 and 119 are vented for opening these jaws. As shown in FIG. 5, the follower roller 167 of the valve 155 for the grippers which have just passed the bottom point of their travel has just passed off the lower end of cam 165, and the jaws 81 and 115 of these grippers have closed. They remain closed until the follower roller 167 of the stated valve comes around to the point where it engages the upper end of cam 165, whereupon the valve is actuated to vent the cylinders 69 and 119 to open jaws 81 and 115 of these grippers.

Means for moving grippers 7 and 9 in and out is shown to comprise a plurality of cam follower levers 171 (see FIGS. 4, 5 and 18), one for each left-hand unit 5L and one for each right-hand unit 5R (there being six such levers in all). Each of levers 171 for the grippers of the left-hand units 5L is pivoted as indicated at 173 on the left-hand spider 41. Each of levers 171 for the grippers of the right-hand units 5R is similarly pivoted at 173 on the right-hand spider 41. Each lever 171 has an arm 175 for simultaneously operating both the hold-down gripper rod 63 and the pivot gripper shaft 93 of the respective unit 5L or 5R. Arm 175 has a rounded-end sleeve 177 fitted therein receiving a screw-threaded stud 179 threaded in the outer end of the rod 63 (see FIG. 8). Arm 175 also has a rounded-end sleeve 181 (see FIG. 10) slidable lengthwise of the arm in a slot 183 (see FIG. 18) in the arm receiving a screw-threaded stud 185 threaded in the outer end of shaft 93. Sleeve 177 is positioned between the outer end of rod 63 and a collar 187 slidable on stud 179 backed by a coil spring 189 reacting from a nut 191 threaded on the outer end of the stud 179. Sleeve 181 is positioned between the outer end of shaft 93 and a collar 193 slidable on stud 185 backed by a coil spring 195 reacting from a nut 197 threaded on the stud 185. Springs 189 and 195 on the drive side (the spring 189 and 195 at the left as viewed in FIG. 7) are open-coiled and act as compression springs for biasing the grippers on the drive side outward during a certain phase of the operation as will be made clear. Springs 189 and 195 on the operator's side (the springs at the right as viewed in FIG. 7) are closely coiled and substantially incompressible.

Each lever 171 carries inner and outer cam follower rollers 199 and 201. The rollers 199 of the levers 171 on the drive side (the levers at the left as viewed in FIG. 4) are engageable with inner and outer barrel cam formation 203R and 205R on the cam plate 153 at the drive side. The rollers 199 of the levers 171 on the operator's side (the levers at the right as viewed in FIG. 4) are engageable with inner and outer barrel cam formations 203L and 205L on the cam plate 153 at the operator's side. The barrel cam formations on both cam plates 153 are so developed and phased as to cause levers 171 for each pair of units 5L and 5R to rock in the direction for pushing inward rods 63 and shafts 93 of this pair of units to move the respective grippers 7 and 9 into gusset-fold-gripping position as the pair comes around with the drum to the bottom point of their travel. As viewed in FIG. 4, lever 171 on the drive side rocks in counterclockwise direction and lever 171 on the operator's side rocks in clockwise direction for this purpose. This is immediately followed by closure of gripper jaws 81 and 115 to grip the gusset folds G1 and G2. The development and phasing of the barrel cam formations 203R and 205R on the drive side is such that, following the closing of gripper jaws 81 and 115 to grip the gusset folds, levers 171 on the drive side are backed off clockwise as viewed in FIG. 4 to some extent thereby to act via springs 189 and 195 on the drive side to bias the grippers 7 and 9 on the drive side outward (with these grippers closed on the gusset folds) for laterally stretching taut the end of the bag tube. This occurs before the pivot grippers 9 swing back to open up the end of the tube. The barrel cam formations act to cause grippers 7 and 9 of each pair of units 5L and 5R to remain in their inward gusset-fold-gripping position, with the two grippers 7 and 9 of the unit 5R on the drive side biased outward by springs 189 and 195, until the gripper jaws 81 and 115 are opened as previously described, then levers 171 on both sides are completely backed off to move the grippers laterally outward to their retracted position. Finally, on return to the low point of their travel, grippers 7 and 9 are again moved inward and the cycle is repeated. When the pivot grippers 9 swing back to open up the end of the tube, springs 107 act to stretch taut the end flaps C of the opened-up bottom.

Figure 6:
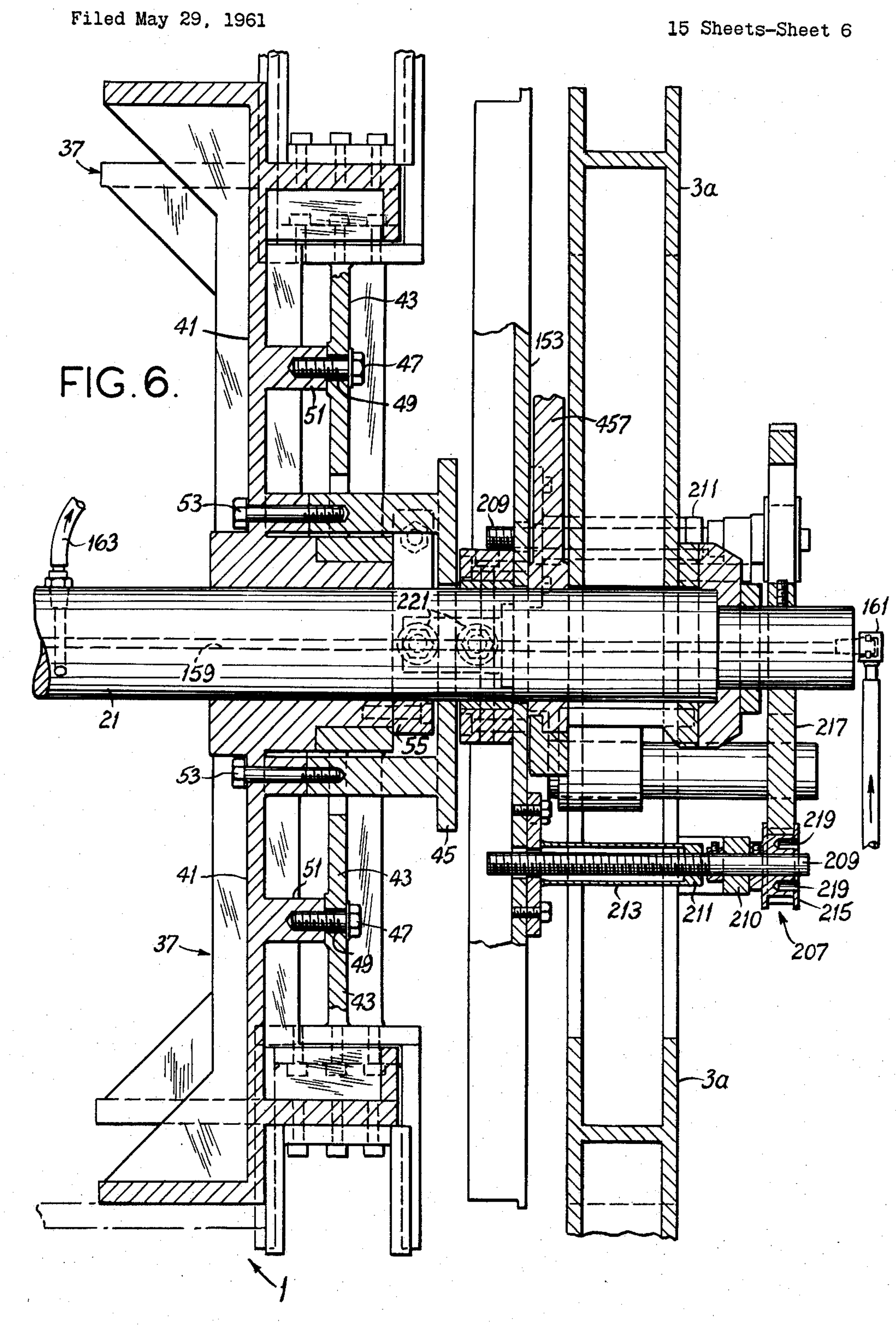
FIG. 6 (sheet 6) is an enlarged vertical transverse section taken substantially on line 6—6 of FIG. 1.

Means generally indicated at 207 in FIG. 6 is provided for adjusting the cam plate 153 and the gripper-supporting spider assembly 37 on the operator's side laterally inward and outward, and similar means 207 is provided for adjusting the cam plate 153 and the gripper-supporting spider assembly 37 on the drive side laterally inward and outward, for operation on bag tubes of different widths. Each adjusting means 207 comprises three adjusting screws, each designated 209, which are mounted for rotation in brackets 210 on frame member 3*a* and which are threaded in nuts 211 fixed on the outer ends of tubular sleeves 213 extending outward from cam plate 153. Each screw has a pinion 215 on its outer end in mesh with a gear 217 (see FIGS. 1, 2 and 6). Each pinion has holes such as indicated at 219 in FIG. 6 for receiving a spanner wrench to turn it. On turning any one pinion 215 in one direction or the other, all three pinions and all three screws 209 are rotated in one direction or the other to move the cam plate 153 in or out. The cam plate 153 carries pairs of rollers 221 (see FIG. 6) straddling the rim of disk 45 for moving the respective spider assembly 37 in and out concomitantly with the cam plate, without interfering with rotation of the drum 1.

The bag tube feed conveyor 11 comprises a pair of endless chains 223 (see FIGS. 1–3) trained around rearward and forward sprockets 225 and 227 on horizontal rearward and forward sprocket shafts 229 and 231 journalled in the frame 3. These chains carry feed dogs 233 spaced at intervals greater than the length of a bag tube. The upper reaches of the chains travel forward through slots 235 in table 237 and the feed dogs on the upper reaches extend up above the table for engagement with the rear ends of bag tubes. The forward sprocket shaft 231 carries a gear 239 (see FIGS. 2 and 3) in mesh with gear 29 for driving the chains in the direction indicated by the arrow in FIG. 2 for pushing bag tubes placed on the table forward toward the bottom of the drum 1, and tangentially with respect to the drum. Side guides for the bag tubes are indicated at 241. A screw-threaded shaft 243 extending across the machine under the upper reaches of the chains has a handwheel 245 on its left end. Shaft 243 is connected by a chain and sprocket drive 247 to a rearward screw-threaded shaft 249 and by a chain and sprocket drive 251 to a forward screw-threaded shaft 253. Shaft 243 is received in drive nuts 255 on left and right-hand slidable carriages 257, and shaft 253 is received in drive nuts 261 on carriages 257. Shaft 249 is received in slidable drive nuts 263. Carriages 257 and nuts 263 are connected as indicated at 265 to side guides 241, the arrangement being such that on turning handwheel 245 in one direction or the other, carriages 257 and the side guides are moved in or out for adjustment for operation on bag tubes or different widths.

To enable the hold-down grippers 7 and the pivot grippers 9 to grip the folds G1 and G2 of the gussets of a bag tube on inward lateral movement of the grippers, means is provided for spreading open the gussets of each bag tube as it approaches the drum 1. This means comprises intermeshing upper and lower gears 267 and 269 carried by the left-hand carriage 257, and a similar pair of gears carried by the right-hand carriage 257. These gears are driven by pinions 271 on a shaft 273 meshing with lower gears 269, the shaft 273 being driven via a gear drive 275 (see FIG. 3) from the forward sprocket shaft 231. The pinions are keyed to the shaft 273 for rotation therewith, and axially slidable on shaft 273 for lateral adjustment along with gears 267 and 269. The pinions have checks straddling the gears 269 so that the pinions move laterally inward and outward with gears 269 and 267 on adjustment of carriages 257. Each of gears 267 and 269 has a hollow hub 277 and a tubular arm 279 extending radially from the hub with a vacuum cup 281 at the end of the arm. The upper and lower gears 267 and 269 at each side of the machine are so phased that once each revolution of these gears, the vacuum cups 281 on the ends of the arms 279 come into engagement with the upper and lower faces of the bag tube adjacent the respective side of the bag tube, grip the upper and lower faces of the bag tube by vacuum, and then, as arms 279 continue their rotation, spread open the gusset at the respective side of the bag tube. Hubs 277 rotate on hollow studs 283 carried by the carriages 257. Vacuum connections are made to these studs as indicated at 285, and the studs have ports such as indicated at 287 in FIG. 5 for drawing vacuum in arms 279 and vacuum cups 281 for an interval as the vacuum cups come into engagement with the faces of the bag tube and then cutting off the vacuum as the cups 281 swing away from the faces of the bag tube. Extending forward from the left and right-hand carriages 257 are left and right-hand track structures, each designated 291. Each of these track structures includes track members defining upper and lower horizontal guide channels 293 and 295 for the upper and lower gusset folds G1 and G2 at the respective side of the bag tube for maintaining these folds in spread-apart relation as the bag tube passes to the drum after the folds have been spread apart by the vacuum cups. The track structures are generally tangential to the drum 1 at the bottom of the drum, and the guide channels are so located as to present the upper gusset folds G1 to the hold-down grippers 7 and to present the lower gusset folds G2 to the pivot grippers 9. As will be apparent, the track structures 291 move in and out with the carriages 257.

A shaft 301 is mounted in frame 3 extending across the machine forward of camshaft 27. Secured to this shaft are arms 303 carrying blades 305 constituting a so-called main crease shovel, the function of which is to define an edge around which the flap B is folded back by the operation of the pivot grippers 9. Shaft 301 has a cam follower arm 307 at its left end carrying a cam follower roller 309 biased by a spring 311 connected to another arm 313 on shaft 301 into engagement with a cam 315 on the left end of camshaft 27. Cam 315 is so developed and phased as to swing blades 305 from the retracted position in which they appear in FIG. 5 to the operative position adjacent the periphery of drum 1 in which they appear in FIG. 1 once each revolution of the cam 315 (and three times each revolution of the drum) with this operation timed to occur just before the pivot grippers 9 of each pair of units 5L and 5R start to swing open.

Referring particularly to FIG. 13, there are illustrated so-called kick-in shoes 321 for kicking in the end flaps C of the opened-up bottom, and holding these flaps C down as the bag tube is carried around and upward with the drum. These kick-in shoes are operated by air cylinders 323 under control of valves 325 actuated by cams 327 on the camshaft 27 (see FIG. 3). In FIG. 13, there is also illustrated a ball-end plunger 329 for pressing the trailing flap B down and holding it down as the bag tube is carried around and upward with the drum. This plunger 329 is operated by an air cylinder 331 under control of a valve 333 actuated by a cam 335 on camshaft 27. As the bag tube with the opened-up bottom is carried around and upward with the drum, it first passes under lower hold-down belts 337, then under upper hold-down belts 339. The lower belts assist in the flattening of the leading flap A of the opened-up bottom. The upper belts hold down the opened-up flattened bottom as the latter is carried around and upward to the pasting station 13. The upper belts are driven via a chain and sprocket drive 341 from a gear 343 in mesh with the bull gear 33, and the lower belts pass around pulleys 345 on the lower shaft 347 for the upper belts and are thereby driven by the upper belts.

At the pasting station 13, there is a paste pan 351 mounted on frame 3. A paste transfer roll 353 is mounted on a shaft 355 for rotation in the pan. A doctor blade for the transfer roll is indicated at 357. The transfer roll is adapted to apply paste from the pan to a paste pattern sector assembly 359. The latter is mounted on a shaft 361 journalled in the ends of a pair of arms 363 pivoted on a shaft 365. The assembly of sector 359, shaft 361 and arms 363 is adapted to swing about the axis of shaft 365. Transfer roll shaft 355 carries a gear 367 in mesh with gear 343 for driving the transfer roll 353 (see FIGS. 2 and 14). At 369 is indicated a shaft located above the drum extending transversely of the bottomer carrying a gear 371 at its right end in mesh with the bull gear 33. This gear 371 meshes with an idler 372 which in turn meshes with a gear 373 on shaft 361 for driving the sector 359. At each end of shaft 361 is a cam 375 (see FIG. 15) engageable with a roller 377 on an arm 379 pivoted at 381 on frame 3. Each arm 379 is biased upward by a spring 383. Associated with each arm 379 is a latch 385 pivoted at 387 on the frame 3. Each latch 385 is biased toward a retracted position by a spring 389 and is adapted to be moved toward an operative position by the plunger 391 of a solenoid 393 when the latter is energized. In their operative position, the two latches 385 are adapted to latch the arms 379 in a raised position (see FIG. 15). Solenoids 393 are controlled by a switch 395 actuated by a feeler 397 (see FIG. 14) for detecting skipped bag tubes.

Normally, latches 385 are retracted (i.e., to the left of their FIG. 15 position) and arms 379 are free to be moved downward by cams 375 on the sector shaft 361. Accordingly, the sector is adapted to engage the transfer roll 353 and the opened-up bottoms of bag tubes coming around with the drum 1 to apply a pattern of paste to each bottom. However, in the case of a skipped bag tube, feeler 397 actuates switch 395 to energize solenoids 393 and, when arms 379 are pulled up by springs 383 as the low points of cams 375 come around to the rollers 377, latches 385 are moved into the position shown in FIG. 15 to hold arms 379 raised. Then, as the cams 375 continue their rotation, the sector is lifted to avoid application of paste to the drum. When the next bag tube comes around with the drum, feeler 397 deactuates switch 395, the solenoids are deenergized, and latches 385 are retracted by springs 389 to resume normal operation.

For folding over the trailing flap B of the opened-up bottom of each bag tube as it passes through the folding station 15, there are provided a so-called trailing flap crease shovel 401 and a trailing flap fold-over shovel 403 (see FIGS. 5 and 16). The crease shovel 401 is moved into position engaging the opened bottom with its rearward edge 404 positioned at the location of the fold line D on which the trailing flap B is to be folded over, travels around with the bottom while the fold-over shovel 403 folds flap B over its rearward edge 404, then is retracted from under the folded-over flap B, and returns for operation on the next bag tube. The crease shovel 401 comprises a flat blade carried by a shovel holder 405 pivoted as indicated at 407 at the lower end of an arm 409 which extends down from a shaft 411 mounted in the frame 3 above and toward the right of the drum 1 as viewed in FIG. 16, and extending transversely of the bottomer. Shaft 411 has a crank 413 at its left end (at the operator's side of the bottomer). Shaft 369 (driven from the bull gear 33 via gear 371) carries a cam assembly 415 at its left end. A link 417 has a slot 419 at one end receiving shaft 369, a pin-and-slot connection at its other end as indicated at 421 with the crank 413, and a cam follower 423 received in a cam groove 425 in the face of cam assembly 415. The cam groove 425 is developed and phased to cause oscillation of arm 409 once each revolution of cam assembly 415 (and three times upon each revolution of the drum) in timed relation to the travel of bag tubes around with the drum.

A cam follower lever 427 is pivoted at 429 on arm 409, and is connected by a link 431 to the shovel holder 405. Lever 427 carries a cam follower roller 433 which is engageable, under the bias of a spring 435, with one or the other of two crescent-shaped cams 437 and 439. Cam 437 is a fixed cam, being fastened to frame 3 as indicated at 441 and 443. Cam 439 is a pivoted lift cam, being carried by a rockshaft 445 extending transversely of the bottomer. This rockshaft has a crank arm 447 at its left end carrying a cam follower roller 449 at its free end engaging the inside of a cam ring 451 of cam assembly 415. The mechanism is such that as arm 409 swings in return direction (i.e., toward the left as viewed in FIG. 16), the lift cam 439 is raised and masks the fixed cam 437. Follower roller 433 then rides on the upper edge of lift cam 439 and holds the trailing flap crease shovel 401 raised from the drum. As the shovel 401 approaches the limit of its return movement, cam 439 swings down to enable spring 435 to swing the shovel 401 down about its pivot 407 to bring the rearward edge 404 of the shovel into engagement with the opened-up bottom of a bag tube at the location of line D on which the trailing flap B is to be folded over (see FIG. 16).

Then, the motion of arm 409 is reversed (i.e., arm 409 swings toward the right as viewed in FIG. 16) and the shovel 401 travels forward at the same speed as the peripheral speed of the drum. As the arm 409 swings forward, follower roller 433 rides on the upper edge of the fixed crescent-shaped cam 437, which is so formed that the rearward edge of the shovel 401 remains in engagement with the opened-up bottom of the bag tube at line D while the trailing flap B is being folded over on line D around the rearward edge 404 of the shovel. During the final phase of forward swing of the arm 409, the shovel 401 is carried forward from under the flap.

The trailing flap fold-over shovel 403 comprises a pair of tongues such as indicated at 453 carried by a shaft 455. Each tongue has a bent-up free end. Shaft 455 extends between the free ends of a pair of arms 457 pivotally mounted on the drum shaft 21 at opposite ends of the drum (between cam plates 153 and frame members 3*a*). Arms 457 are oscillated about the axis of shaft 21 by mechanism indicated generally at 459, including a shaft 461 carried by frame 3 extending transversely of the bottomer, and having a gear 463 (see FIG. 2) on its right end in mesh with the bull gear 33. Shaft 461 carries a cam assembly 465 at its left end. A rockshaft 467 carried by frame 3 extends parallel to shaft 461. A sleeve 468 on this rockshaft carries two crank arms such as indicated at 469 adjacent its ends, and is yieldably connected to the rockshaft by a torsion relief spring 470. Each crank arm 469 is connected to a respective arm 457 by a link 471. The rockshaft 467 also carries a crank arm 473 at its left end provided with a cam follower roller 475 received in a cam groove 477 in cam assembly 465. The arrangement is such as to cause arms 457 carrying the fold-over shovel 403 to oscillate once each revolution of the shaft 461 (and three times each revolution of the drum 1) thereby to carry the shovel 403 forward for folding over the trailing flap B of a bag tube coming around with the drum and then returning the shovel 403 for operation on the next bag tube coming around with the drum.

Shaft 455 has an arm 479 at its left end carrying a cam follower roller 481. This is engageable, under the bias of a spring 483, with one or the other of two arcuate cams 485 and 487. Cam 485 is a fixed cam, being fastened to the frame 3. Cam 487 is pivoted a lift cam, being pivoted at 489 on the frame 3, and has a cam follower 493 engaging the inside face of a cam ring 495 of cam assembly 415. The mechanism is such that as arms 457 swing the shovel 403 in return direction (i.e., toward the left as viewed in FIG. 16), the lift cam 487 is raised. Follower 481 then rides on the upper edge of the lift cam 489 and holds the tongues of shovel 403 raised from the drum. On a forward stroke of the shovel 403 (i.e., toward the right as viewed in FIG. 16), the lift cam is lowered and the action of the shovel 403 is controlled by the fixed cam 485, which is formed to cause the tongues 453 of the shovel to tilt down into engagement with a bag tube behind the trailing flap B so that, as the tongues move forward, they enter under the trailing flap B and cause it to fold up and over the edge 404 of the shovel 401 (see FIG. 16). During the initial phase of forward movement of the tongues, they travel faster than the bag tube, so as to sweep over the trailing flap. Then they travel together with the bag tube, and, when shovel 401 is withdrawn from under the folded-over flap B, they remain in engagement with the folded-over flap B to hold it down until the leading end of the bag tube starts to pass through the leading flap folding station 17.

For holding down the folded-over trailing flap B after the shovel 403 disengages therefrom and starts a return stroke and as the leading end of each bag tube is carried around to the second folding station, there is provided a hold-down mechanism generally designated 501 (see FIG. 17). This includes an air cylinder 503 carried by the frame 3 extending generally radially with respect to the drum 1. A piston rod 505 extends radially inward from a piston in the cylinder and has a pair of hold-down shoes such as indicated at 507 mounted on its radially inner end. Operation of cylinder 503 is controlled by a valve 509 actuated by a cam 511 on the left end of shaft 461 (see FIG. 20), this cam being developed and phased to cause shoes 507 to move in and engage the trailing flap B shortly before shovel 403 starts its return stroke, and to hold shoes 507 in until after the trailing flap B has passed by the shoes.

For folding over the leading flap A of the opened-up bottom of each bag tube as it passes through the second folding station 17 (after flap B has been folded over), there are provided a so-called leading flap crease shovel 521 and a so-called leading flap fold-over flipper assembly 523 (see FIG. 17). Shovel 521 comprises an assembly of a pair of shovel blades 525 carried by arms 527 extending from a rockshaft 529. Each arm 527 has a clamp hub 531 whereby it may be clamped at various axial positions of adjustment on the rockshaft for operation on bag tubes of different widths. Each shovel blade has a short cheek 533 and a long cheek 535 (see FIG. 19) which straddle the end of the arm 527, and is pivoted on the end of the arm by a pin 537 extending through these cheeks. A spring 538 biases blade 525 to rock clockwise as viewed in FIG. 17, movement of the blade being limited by engagement of a stop screw 539 threaded in a cap 541 on cheek 535 with the top of arm 527. Shaft 529 has a crank arm 543 on its right end carrying a cam follower roller 545 engageable with a cam 547 on shaft 461 (see FIG. 21). A spring 549 biases arm 543 to maintain roller 545 in engagement with the cam and tends to rock the shaft 529 clockwise as viewed in FIG. 21. A rod 551 extending parallel to shaft 529 carries a pair of arms 553 which extend forward under shaft 529 and which have upwardly extending adjustable stops 555 at their forward ends engageable by the bottoms of cheeks 535. Arms 553 have clamp hubs 557 whereby they may be clamped at various axial positions of adjustment on rod 551. The latter is nonrotatably fixed in the frame 3.

The flipper assembly 523 comprises a plurality of so-called flippers 559 mounted on a rockshaft 561 journalled in frame 3 adjacent the drum below the shovel 521. The flippers have clamp hubs 563 whereby they may be clamped at various positions of axial adjustment on shaft 561. Shaft 561 has a crank arm 565 (see FIG. 20) on its left end carrying a cam follower roller 567 engageable with a cam 569 on shaft 461. A spring 571 connected to an arm 573 on shaft 561 biases this shaft to rock clockwise as viewed in FIG. 20 and holds follower roller 567 in engagement with the cam 569.

Cam 547 is so developed that, once each revolution thereof (and three times each revolution of drum 1), the shovel rockshaft 529 is oscillated to swing shovel arms 527 and the shovel blades 525 clockwise (forward) as viewed in FIG. 17 from the retracted position shown in dotted lines in FIG. 17 toward the drum, and then swing them back to retracted position. The timing is such that the edges of the shovel blades 525 come into engagement with the leading flap A of a bag tube coming around the drum at the location of the line E on which the flap A is to be folded over. As the shovel blades swing forward, their cheeks 535 come into engagement with stops 555 (see FIG. 17). Cam 569 is so developed that, once each revolution thereof (and three times each revolution of the drum 1), the flipper rockshaft 561 is oscillated to swing the flippers 559 from the inner position shown in dotted lines in FIG. 17, wherein the upper ends of the flippers are positioned to have the leading edge of the leading flap A slide thereover, to the outer position shown in solid lines in FIG. 17 for folding over the flap A on the fold line E established by the shovel blades 525. Cam 569 has a sharp drop 575 and is so phased that the flippers are quickly snapped from their inner to their outer position immediately after the shovel blades have come into their creasing position. In their outer position, the flippers effect folding over of the leading flap A on the fold line E established by the shovel blades 525 (see FIG. 17). After the folding over of flap A by the flippers has been initiated, the shovel blades 525 swing back to their retracted position, and after the bag tube has completely passed by the flippers 559, the flippers are returned to their inner position.

Each bag tube, having had the trailing bottom flap B folded over by tongues 453 of shovel 403 and the leading flap A folded over by flippers 559, then passes between the drum 1 and a presser roll 601 to the conveyor 19. Roll 601 (which may be a rubber roll) is mounted on a shaft 602 carried by a pair of arms 603 pivoted as indicated at 605 on frame 3 and biased toward the drum by springs as indicated at 607. Conveyor 19 comprises left-hand and right-hand upper belts 609 and left-hand and right-hand lower belts 611, and mechanism generally designated 613 and including a handwheel 615 for adjusting the left-hand and right-hand belts in and out.

Figures 10, 11, 11A:
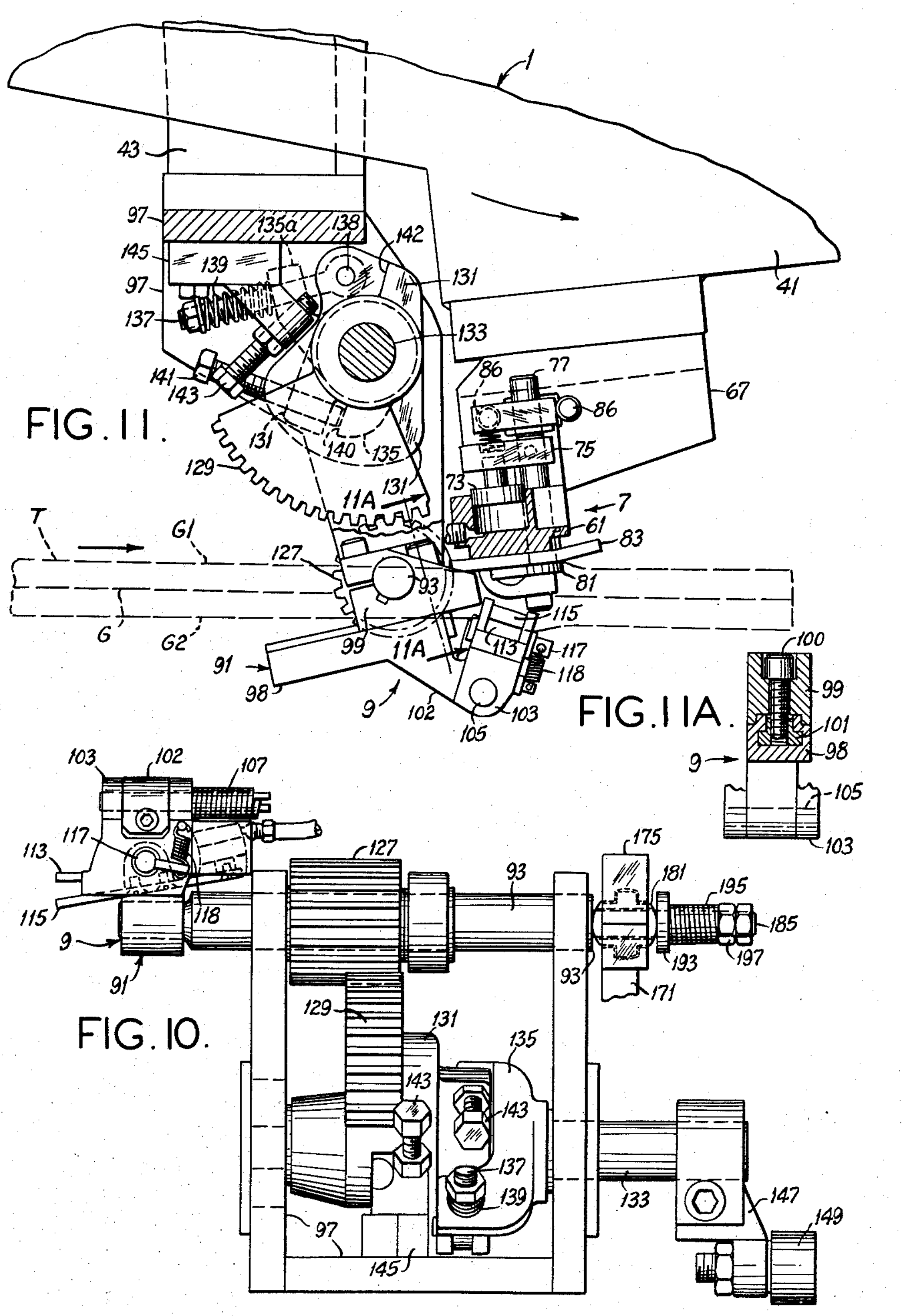
FIG. 10 (sheet 10) is a view taken substantially on line 10—10 of FIG. 7 showing a so-called pivot gripper per se, and illustrating the jaws of the pivot gripper open.
FIG. 11 (sheet 10) is a view illustrating certain details of the pivot gripper, the gripper being shown in its initial position (as distinguished from its swung-open position of FIG. 7), parts being broken away and shown in section.
FIG. 11A (sheet 10) is a section taken on line 11A—11A of FIG. 11.

Operation is as follows:

As will be understood, the bottomer will be set up to operate on a run of bag tubes T of a certain width and a certain gusset size. In this regard, it will be understood that, as regards bag tube width, the set up involves axial adjustment of spider assemblies 37 on shaft 21 as previously described to move the spider assemblies and the respective cam plates 153 axially inward or outward on shaft 21 to determine the retracted position of grippers 7 and 9 outward of the sides of the bag tubes. As regards gusset size, it is necessary to make the radial distance between the axis of shaft 93 of each pivot gripper 9 and the jaws 113, 115 of the respective pivot gripper correspond to the width of one gusset panel. This is accomplished by suitable angular adjustment of spider 43 of each spider assembly 37 relative to the spider 41 of the respective assembly, and by suitable adjustment of arm 98 of each pivot gripper relative to the respective hub 99 on the pivot gripper shaft 93 to maintain pivot gripper jaws 113, 115 in position overlying hold-down gripper jaws 81, 83 as shown in FIG. 11.

Bag tubes T are placed endwise one at a time on conveyor 11 and fed forward endwise toward the drum 1 one after another by the feed dogs 233 on the conveyor chains 223. As each bag tube approaches the drum 1, arms 279 (see FIG. 5), rotating with gears 267 and 269, come around into position for engagement of vacuum cups 281 on the ends of the arms with the upper and lower faces of the bag tube adjacent the sides of the tube and at the leading end of the bag tube. The upper arms 279 rotate clockwise and the lower arms 279 rotate counterclockwise as viewed in FIG. 5. As the vacuum cups come into engagement with the bag tube, the vacuum passages in the arms 279 come into register with vacuum ports 287 in studs 283 on which the hubs 277 of the gears 267 and 269 rotate, and vacuum is drawn in the cups. Consequently, as the arms 279 swing away from their vertical mating position (in which the upper arms extend vertically downward and the lower arms extend vertically upward), the gussets G at opposite sides of the bag tube are spread open (see FIG. 22 showing the upper gusset folds G1 spread open from the lower gusset folds G2). Then, the vacuum in the vacuum cups is cut off, and arms 279 continue rotating around to bring the vacuum cups back into engagement with the next bag tube. The spread-apart upper and lower gusset folds G1 and G2 of the bag tube then enter the upper and lower channels 293 and 295 of the track structures 291 (see FIG. 5) and are thereby held spread apart for presentation to the grippers 7 and 9 of gripper units 5L and 5R of one of the three bottom-opening mechanisms O coming around with the drum 1.

The feed of the bag tubes is so correlated with the rotation of the drum 1 that, as the leading end of a bag tube being fed forward by conveyor 11 emerges from the guide channels 293 and 295, one of the three bottom-opening mechanisms O (comprising a pair of gripper units 5L and 5R) reaches the bottom of its circle of travel. At this point, levers 171 for the respective pair of gripper units 5L and 5R are actuated by the barrel cam formations 203L, 205L, 203R, 205R to push the respective hold-down gripper rods 63 and pivot gripper shafts 93 laterally inward thereby to move the respective hold-down grippers 7 and the respective pivot grippers 9 laterally inward. Jaws 81 and 83 of the hold-down gripper 7 of the left-hand unit 5L then come into a position straddling the left-hand upper gusset fold G1 and jaws 113 and 115 of the pivot gripper 9 of the left-hand unit 5L come into a position straddling the left-hand lower gusset fold G2. Jaws 81 and 83 of the hold-down gripper 7 of the right-hand unit 5R come into a position straddling the right-hand upper gusset fold G1 and jaws 113 and 115 of the pivot gripper 9 of the right-hand unit 5R come into position straddling the right-hand lower gusset fold G2.

Immediately following the movement of the pair of hold-down grippers 7 and the pair of pivot grippers 9 into gusset-fold-straddling position as above described, the cam follower rollers 167 on levers 169 of the two valves 155 for these grippers ride off the arcuate cam ribs 165 on cam plates 153. These two valves 155 then effect delivery of compressed air to gripper cylinders 69 and 119 to effect closure of gripper jaws 81 and 115. The timing is such that jaws 81 and 115 close to grip gusset folds G1 and G2 at points X and Y such as illustrated in FIG. 24, spaced back from the leading edge of the bag tube an appropriate distance for formation of the S. O. S. bottom.

With jaws 81 and 115 of the grippers closed on the gusset folds G1 and G2 at both sides of the bag tube, the tube is gripped to the drum 1 and is carried around with the drum. Immediately following the closing of the jaws, lever 171 on the drive side (the left side as viewed in FIGS. 4 and 7) is backed off by the barrel cam formations 203R and 205R (i. e., swung in clockwise direction as viewed in FIG. 4 from its fully advanced position). Spring 189 for the hold-down gripper rod 63 on the drive side thereupon acts to bias this rod and the respective hold-down gripper 7 laterally outward (toward the left as viewed in FIGS. 4 and 7), and spring 195 for the pivot gripper shaft 93 on the drive side thereupon acts to bias this shaft and the respective pivot gripper 9 laterally outward (toward the left as viewed in FIGS. 4 and 7). This laterally stretches taut the leading end of the bag tube which is gripped by the pair of grippers 7 and the pair of grippers 9 at both sides.

Figure 4:
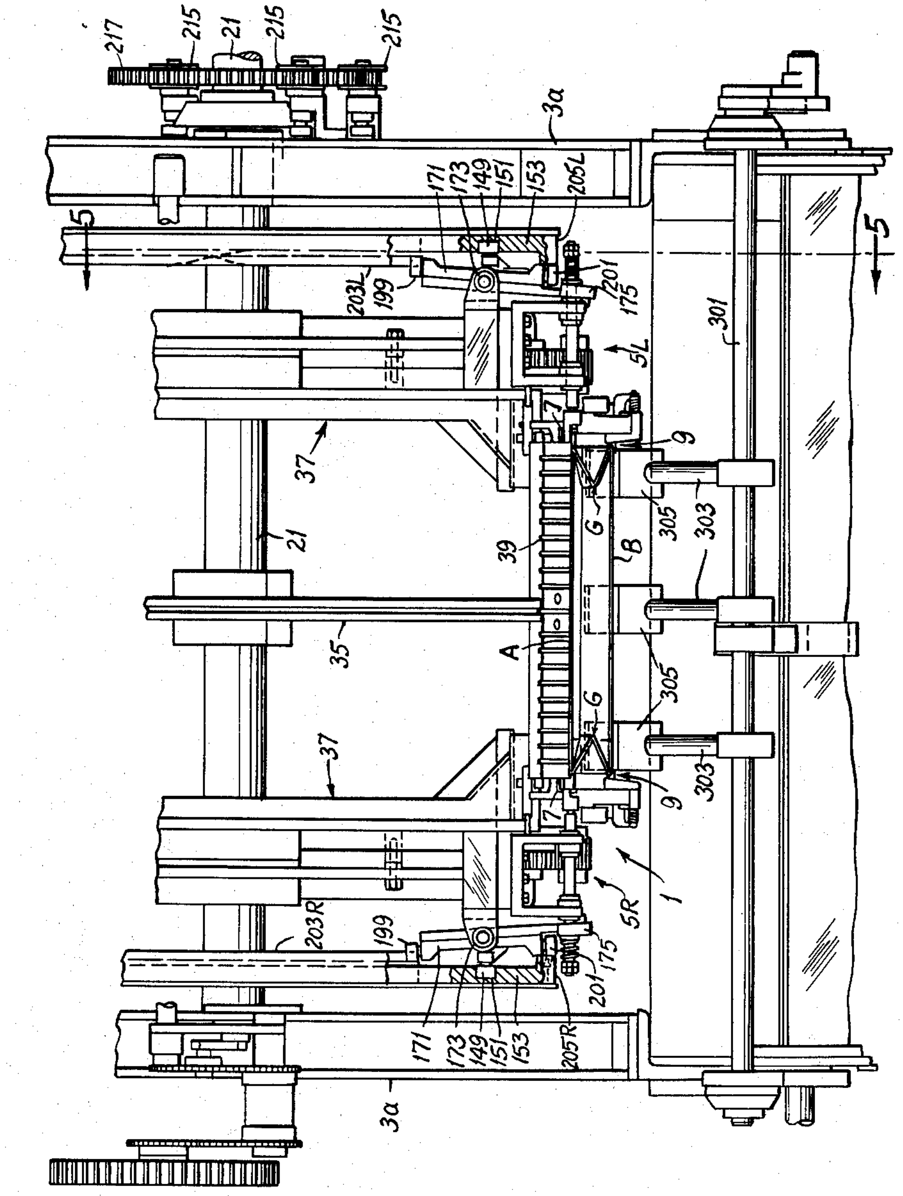
FIG. 4 (sheet 4) is an enlarged vertical transverse section taken substantially on line 4—4 of FIG. 1, with parts broken away.

Immediately following the gripping and stretching of the bag tube T, cam 315 swings the main crease shovel blades 305 from their retracted position of FIG. 5 toward the drum, and the edges of the blades 305 engage the bag tube on line L on which the flap B is to be folded back (see FIG. 1 showing the shovel blades 305 in their advanced position and FIGS. 23–25 showing line L). This is followed by swinging back of the two pivot grippers 9 at both sides of the bag tube from their first angular position as illustrated best in FIG. 11 to their second angular position trailing the hold-down grippers 7 for opening up a bottom. The swinging back of the pivot grippers is effected by the action of cam grooves 151 on the follower rollers 149 on arms 147, with resultant rotation of shafts 133 and sector gears 129 on shafts 133, the sector gears meshing with gears 127 on the pivot gripper shafts 93 to effect rotation of the latter. FIG. 4 shows the pivot grippers starting to swing back, and shows the bottom partially opened. Noting that the hold-down grippers 7 (which are stationary relative to drum 1) grip the radially inner folds G1 of the gussets of the tube at points X, and that the pivot grippers 9 grip the radially outer folds G2 of the gussets at points Y, the pivot grippers, in swinging back, cause a portion of the radially outer wall of the bag tube to fold back around line L established by the edges of the main crease shovel blades 305. This portion constitutes flap B (see FIG. 24).

When the pivot grippers 9 swing back from their first to their second anuglar position and open up the bottom, the clevis-shaped body 103 of each pivot gripper, being pivoted at 105 on extension 102 of arm 98 of the pivot gripper, swings on the axis of pivot 105 in counterclockwise direction as viewed in FIG. 12A (i. e., in the direction to carry finger 109 away from stop 111) against the bias of coil spring 107 (see FIG. 12). As a result, the pivot grippers are biased circumferentially of the drum 1 by the coil springs 107 in trailing direction to stretch the end flaps C of the opened-up bottom.

Referring to FIG. 7, it will be observed that when the bottom is completely opened, the hold-down gripper 7 at the left of FIG. 7 is biased outward toward the left by the respective spring 189 to stretch the bag tube laterally on the line E on which the leading flap A is ultimately to be folded over. The pivot gripper 9 at the left of FIG. 7 is biased outward toward the left by the respective spring 195 to stretch the bag tube laterally on the line D on which the trailing flap B is ultimately to be folded over. The two pivot grippers 9 at both sides are biased (by the respective coil springs 107) in trailing direction (downward as viewed in FIG. 7) to stretch the end flaps C. When the bottomer has been set up to operate on bag tubes of a given width and gusset size, any variations from standard width and gusset size as may occur are automatically compensated for by the ability of the grippers to stretch the tubes as described.

As the pivot grippers 9 swing back to open up the bottom, the air cylinders 323 and 331 are operated to drive the kick-in shoes 321 and plunger 329 inward toward the drum. Shoes 321 engage the end flaps C, kick them in and hold them down. Plunger 329 presses and holds down the trailing flap B. After the leading end of the bag tube has passed by, the kick-in shoes and plunger are retracted.

With the bottom opened up at the leading end of the bag tube T as shown best in FIG. 7, the bag tube is carried around through the pasting station 13 where a pattern of paste P as shown in FIG. 24 is applied by the paste pattern sector assembly 359. In case of a skipped bag tube, the sector 359 is automatically lifted as previously described to prevent fouling the drum with paste.

Following the application of paste, the bag tube T is carried through the first folding station 15 where the trailing flap B is folded over on fold line D. As the bag tube enters this station, arm 409, swinging rearward (toward the left as viewed in FIG. 16) under control of cam groove 425 in cam assembly 415, carries the trailing flap crease shovel 401 into position for engagement of the rearward edge 404 of the shovel with the flap B on line D, and link 431 is let off by lowering of the lift cam 439 under the action of cam ring 451 of cam assembly 415 to allow shovel 401 to pivot downward for engagement of its rearward edge 404 with flap B on line D. Then the motion of arm 409 is reversed to carry the shovel 401 forward (toward the right as viewed in FIG. 16) in unison with the bag tube, and the rearward edge of the shovel is maintained in engagement with flap B on line D for an interval sufficient for the trailing flap fold-over shovel 403 to sweep under the flap B and fold it over on line D around the rearward edge of the shovel. When the rearward edge of the crease shovel 401 comes into engagement with flap B on line D, the fold-over shovel 403 sweeps forward (toward the right as viewed in FIG. 16) under control of cam groove 477 in cam assembly 465 and is lowered under control of the fixed cam 485 (lift cam 487 being lowered at this time). Accordingly, the fold-over shovel 403 enters underneath the flap B and folds it up and over around the rearward edge 404 of the crease shovel 401 (see FIG. 16).

As arm 409 completes its forward swing, the crease shovel 401 is withdrawn from under the folded-over flap B. Then arm 409 is returned (swung rearward) for operation on the next bag tube coming around with the drum. Lift cam 439 is raised to mask fixed cam 437 and hold shovel 401 up clear of the bag tube upon which fold-over of flap B has been completed and clear of the leading flap A of the next bag tube, then is again lowered to allow the shovel to engage the trailing flap B of the next bag tube. As the fold-over shovel 403 completes its sweep over the crease shovel 401 to fold flap B over on line D, the lift cam 487 is raised to mask the fixed cam 485 and hold shovel 403 up as shovel 403 returns for operation on the next bag tube coming around with the drum.

Following the folding over of the trailing flap B, the bag tube T is carried through the second folding station where the leading flap A is folded over on fold line E. Hold-down shoes 507 are moved inward by air cylinder 503 into engagement with the folded-over trailing flap B to hold it down. The leading flap crease shovel blades 525 are swung under control of cam 547 from their retracted position shown in dotted lines in FIG. 17 to their advanced position shown in solid lines in FIG. 17 wherein their lower edges engage the leading flap A on line E. Immediately following this movement of the crease shovel blades, flippers 559 are swung with snap action under the control of cam 569 from their inner retracted position shown in dotted lines in FIG. 17 to their outer position shown in solid lines in FIG. 17 to cause the leading flap A to fold back on line E over the lower edges of the crease shovel blades 525. The folded-over flap A then passes underneath the flippers 559 and is pressed down by the presser roll 601. The hold-down shoes 507 and the blades 525 are retracted. The flippers remain clear of the bag tube until it has completely passed them by, then complete their return to retracted position.

The jaws 81 and 115 of the hold-down grippers 7 and pivot grippers 9 of each opening mechanism O remain closed on the gusset folds G1 and G2 of a bag tube from the time they are first closed at the bottom of their circle of travel until they have passed through the second folding station 17 and the flippers have folded over the leading flap A. At this point, the cam follower rollers 167 on levers 169 of the respective pair of valves 155 come onto the upper ends of the arcuate cam ribs 165. These valves are thereby deactuated to vent the respective gripper cylinders 69 and 119. The jaws 81 and 115 are thereupon opened by the respective return springs 85 and 118, releasing the grip of the grippers on the bag tube. The grippers 7 and 9 at both sides are then fully retracted laterally outward clear of the bag tube by the action of the barrel cam formations 203L, 205L, 203R, 205R on levers 171. After retraction, the pivot grippers 9 at both sides are returned to their initial angular position such as illustrated in FIG. 11 by the action of cam grooves 151. Thus, the grippers 7 and 9 of each bottom-opening mechanism O are returned to their initial positions, with their jaws open, following passage through station 17 for operation on another bag tube fed toward the drum by conveyor 11. Here it will be understood that, as each bag tube completes its passage through station 17, it is stripped from the drum and carried away by the conveyor 19. The path followed by each bag tube in being carried away by conveyor 19 is indicated in dot-dash lines in FIG. 17.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. Apparatus for operating on gusseted bag tubes to form a bottom at one end of each tube, with the bottom being of the type comprising inwardly directed end flaps and side flaps one overlapping the other, said apparatus comprising a rotary drum, means for continuously driving the drum, means for feeding gusseted bag tubes one after another endwise toward the drum, at least one bottom-opening mechanism carried by the drum for operating on the leading end of each bag tube fed endwise thereto to open up a bottom at said leading end of each tube, said bottom-opening mechanism comprising two gripper units spaced apart laterally on the drum for operating on opposite sides of a bag tube, each gripper unit comprising a first gripper for gripping the radially inner fold of the gusset of the bag tube at the respective side of the tube, and a second gripper for gripping the radially outer fold of the gusset at the respective side of the tube, said first grippers being adapted to grip the radially inner folds of the gussets at opposite sides of the tube and hold them stationary relative to the drum, said second grippers being adapted to grip the radially outer folds of the gussets at opposite sides of the drum and being pivotally mounted on the drum for swinging movement relative thereto from a first angular position wherein they are positioned to grip the outer gusset folds at points outward of the first grippers to a second angular position trailing the first grippers for opening up a bottom at said leading end of the tube with the opened-up bottom comprising inwardly directed end flaps and leading and trailing flaps, said first and second grippers being mounted for lateral inward and outward movement relative to the drum between a retracted position outward of the sides of a tube and an inner position wherein they are adapted to grip the gusset folds, gripper actuating means for moving the grippers inward from their retracted position with the grippers open, then closing the grippers in timed relation to the feed of the bag tubes for gripping the gusset folds of a tube, and then swinging the second grippers to said second angular position, and means for biasing outward both the first and second grippers of at least one of the gripper units while the grippers are gripping the gusset folds to stretch the walls of the tube laterally and for biasing one of the grippers of each unit circumferentially of the drum for stretching the end flaps, said gripper actuating means including cam means fixed relative to the drum and cam follower means rotary with the drum for controlling inward and outward movement of the first and second grippers of each gripper unit, said cam means being formed to act via said cam follower means to move the first and second grippers of each gripper unit inward to the inner position for gripping the gusset folds of a tube and to release both the first and second grippers of said one gripper unit after the grippers have gripped the gusset folds of a tube for outward bias by said biasing means of both said first and second grippers of said one gripper unit while gripping the gusset folds of a tube to stretch the walls of the tube laterally.

2. Apparatus as set forth in claim 1 further comprising a main crease shovel movable from a retracted position to a position engaging the outside of the tube wherein it defines a fold line around which the trailing flap is folded back by said second grippers, and means for operating said main crease shovel in timed relation to the rotation of the drum.

3. Apparatus as set forth in claim 2 further comprising means operable in timed relation to the rotation of the drum for kicking in the end flaps of the opened-up bottom.

4. Apparatus as set forth in claim 3 further comprising means operable in timed relation to the rotation of the drum for pressing down the trailing flap.

5. Apparatus as set forth in claim 1 further comprising means for applying adhesive to the opened-up bottom of the tube as it is carried around with the drum, and means for folding over the trailing and leading flaps of the opened-up bottom of the tube as it is carried around with the drum after the application of adhesive.

6. Apparatus as set forth in claim 1 further comprising means for applying adhesive to the opened-up bottom of the tube as it is carried around with the drum, means for folding over the trailing flap of the opened-up bottom of the tube as it is carried around with the drum after the application of adhesive, and means for folding over the leading flap of the opened-up bottom of the tube as it is carried around with the drum after the folding over of the trailing flap.

7. Apparatus as set forth in claim 6 wherein said gripper actuating means acts to release the grippers after the leading flap has been folded over, move the grippers outward to retracted position, and then swing the second grippers to said first angular position.

8. Apparatus as set forth in claim 7 wherein said means for folding over the trailing flap comprises a creaser blade movable from a retracted position to a position engaging the trailing flap wherein it defines a fold line around which the trailing flap is to be folded over and then movable with the drum, a fold-over shovel for folding over the trailing flap on said line, and means for operating said creaser blade and shovel in timed relation to the rotation of the drum.

9. Apparatus as set forth in claim 7 wherein said means for folding over the leading flap comprises a creaser shovel movable from a retracted position to a position engaging the leading flap wherein it defines a fold line around which the leading flap is to be folded over, flipper means movable from a retracted position to a position for flipping over the leading flap on said leading flap fold line, and means for operating said creaser shovel and flipper means in timed relation to the rotation of the drum.

10. Apparatus as set forth in claim 1 wherein said gripper actuating means includes air cylinders for controlling the opening and closing of the grippers, and means for actuating said air cylinders in timed relation to the rotation of the drum.

11. Apparatus as set forth in claim 10 wherein said gripper units and said cam means are axially movable for adjustment to different positions for operation on bag tubes of different widths, and wherein means is provided for simultaneously adjusting said gripper units and cam means.

12. Apparatus as set forth in claim 11 wherein said first and second grippers are movable relative to one another circumferentially of the drum for adjustment to different positions for operation on bag tubes with different gusset widths.

13. Apparatus as set forth in claim 12 wherein said drum comprises a shaft, and a pair of spider assemblies axially slidable on the shaft, each spider assembly comprising a first spider carrying a respective first gripper and a second spider carrying a respective second gripper, the second spider being adjustably rotatable relative to the first spider.

14. A rotary bottomer for operating on gusseted bag tubes to form a bottom at one end of each tube, with the bottom being of the type comprising inwardly directed end flaps and side flaps one overlapping the other, said bottomer comprising a frame, a rotary drum comprising a horizontal shaft journalled in the frame and a pair of spider assemblies spaced axially on the shaft, means for continuously driving the shaft thereby continuously to rotate the drum, means for feeding gusseted bag tubes one after another endwise toward the drum in timed relation to the rotation of the drum, a plurality of bottom-opening mechanisms carried by the spider assemblies for operating on the leading end of each bag tube fed endwise thereto to open up a bottom at said leading end of each tube, each bottom-opening mechanism comprising two gripper units, one carried by one spider assembly and the other carried by the other spider assembly, for operating on opposite sides of a bag tube, each gripper unit comprising a hold-down gripper mounted on a rod slidable laterally inward and outward but held against rotation relative to the respective spider assembly and a pivot gripper mounted on a shaft slidable laterally inward and outward and rotatable relative to the respective spider assembly, each hold-down gripper having relatively movable jaws adapted to be moved from an open to a closed position for gripping the radially inner folds of the gussets of a bag tube, each pivot gripper comprising a body mounted on the respective pivot gripper shaft carrying relatively movable jaws adapted to be moved from an open to a closed position for gripping the radially outer folds of the gussets of a bag tube, said pivot gripper shafts being rotatable to swing the pivot gripper bodies from a first angular position wherein the pivot gripper jaws are positioned to grip the outer gusset folds at points outward of the hold-down grippers to a second angular position trailing the hold-down grippers for opening up a bottom at said leading end of the tube with the opened-up bottom comprising inwardly directed end flaps and leading and trailing flaps, means for moving the hold-down gripper rods and pivot gripper shafts inward from a retracted position located outward of the sides of a bag tube to an inner position wherein they are adapted to grip the gusset folds of a bag tube fed toward the drum, means for then closing the gripper jaws to grip the gusset folds, means for then rotating the pivot gripper shafts to swing the pivot gripper bodies to said second angular position, first spring means associated with the hold-down gripper rods and pivot gripper shafts of the units on one side for biasing outward the respective grippers while they are gripping the gusset folds to stretch the walls of each tube laterally, means mounting said pivot gripper bodies for pivotal movement relative to the pivot gripper shafts, and second spring means biasing said pivot gripper bodies to swing in the direction for stretching the end flaps circumferentially, said means for moving the hold-down gripper rods and pivot gripper shafts inward from their retracted position comprising cam plates nonrotatably carried by the frame at opposite sides of the drum having cam means thereon cooperable with cam follower means rotary with the drum for controlling inward and outward movement of the hold-down gripper rods and pivot gripper shafts of each gripper unit, said cam means being formed to act via said cam follower means to move the hold-down gripper rod and the pivot gripper shaft of each gripper unit inward to the inner position for gripping the gusset folds of a tube, the cam means on at least one of the cam plates also being formed to release both the hold-down gripper rod and the pivot gripper shaft of each gripper unit on the respective side of the drum after the respective grippers have gripped the gusset folds of a tube for outward bias by the respective first spring means of both the hold-down gripper rod and the pivot gripper shaft of each gripper unit on said respective side of the drum while gripping the gusset folds of a tube to stretch the walls of the tube laterally.

15. A rotary bottomer as set forth in claim 14 wherein the means for closing the gripper jaws comprises air cylinders for the respective jaws, valve means for controlling the air cylinders rotary with the drum, and cam means on said cam plates for actuating the valve means in timed relation to the rotation of the drum.

16. A rotary bottomer as set forth in claim 15 wherein the means for rotating the pivot gripper shafts comprises cam means on said cam plates.

17. A rotary bottomer as set forth in claim 16 wherein said spider assemblies and cam plates are axially movable for adjustment to different positions for operation on bag tubes of different widths.

18. A rotary bottomer as set forth in claim 17 wherein means is provided for moving said cam plates axially inward and outward and wherein connections are provided between the cam plates and spider assemblies for moving the latter inward and outward with the cam plates.

19. A rotary bottomer as set forth in claim 17 wherein each spider assembly comprises a first spider carrying the respective hold-down grippers and a second spider carrying the respective pivot grippers, the second spider being adjustably rotatable relative to the first spider.

20. A rotary bottomer as set forth in claim 14 wherein said tube-feeding means is positioned to feed bag tubes tangent to the bottom of the drum, and includes means for spreading open the gussets of each tube at the leading end thereof as it approaches the drum, the grippers of each bottom-opening mechanism being moved inward to grip the gusset folds of a tube as the bottom-opening mechanism comes around to the bottom of the drum.

21. A rotary bottomer as set forth in claim 20 further comprising a main crease shovel movable from a retracted position to a position engaging the outside of a tube wherein it defines a fold line around which said pivot grippers fold back the trailing flap, and cam means for operating said main crease shovel in timed relation to the rotation of the drum.

22. A rotary bottomer as set forth in claim 21 further comprising air-cylinder-operated kick-in shoes for kicking in the end flaps of the opened-up bottom, and cam-operated valve means for controlling the operation of said kick-in shoes in timed relation to the rotation of the drum.

23. A rotary bottomer as set forth in claim 22 further comprising an air-cylinder-operated presser for pressing down the trailing flap in conjunction with the operation of the kick-in shoes, and cam-operated valve means for controlling the operation of said presser in timed relation to the rotation of the drum.

24. A rotary bottomer as set forth in claim 21 further comprising means supported by the frame for applying adhesive to the opened-up bottom of each tube as it is carried around with the drum, means for folding over the trailing flap of the opened-up bottom of the tube as it is carried around with the drum after the application of adhesive, and means for folding over the leading flap of the opened-up bottom of the tube as it is carried around with the drum after the folding over of the trailing flap.

25. A rotary bottomer as set forth in claim 24 wherein said means for folding over the trailing flap comprises a creaser blade and a fold-over shovel, said blade having an edge around which the trailing flap is adapted to be folded by said shovel, means mounting said creaser blade for movement away from and back to a retracted position, means for actuating said blade to move it away from retracted position and bring its edge into engagement with the trailing flap on a line on which the trailing flap is to be folded over, then to move the blade around with the drum and back toward retracted position, means mounting the shovel for movement away from and back to a retracted position, and means for actuating the shovel to move it away from retracted position and causing it to enter under the trailing flap and sweep over the blade, thereby to fold over the trailing flap, and then to return the shovel to retracted position.

26. A rotary bottomer as set forth in claim 24 wherein said means for folding over the leading flap comprises a leading flap creaser shovel and a flipper means, said leading flap creaser shovel having an edge around which the leading flap is adapted to be folded by said flipper means, means mounting said leading flap creaser shovel for movement away from and back to a retracted position, means for actuating said leading flap creaser shovel to move it away from retracted position and bring its edge into engagement with the leading flap on a line on which the leading flap is to be folded over and then to move it back to a retracted position, means mounting said flipper means for movement away from and back to a retracted position, and means for actuating the flipper means to move it away from retracted position into position to cause the leading flap to fold back over the edge of the leading flap creaser shovel and then to move it back to retracted position.

27. A rotary bottomer for operating on gusseted bag tubes to form a bottom at one end of each tube, with the bottom being of the type comprising inwardly directed end flaps and side flaps one overlapping the other, said bottomer comprising a rotary drum, means for continuously driving the drum, means for feeding gusseted bag tubes one after another endwise toward the drum, at least one bottom-opening mechanism carried by the drum for operating on the leading end of each bag tube fed endwise thereto to open up a bottom at said leading end of each tube and carrying the tube around with the drum, with the opened-up bottom comprising inwardly directed end flaps and leading and trailing flaps, means for applying adhesive to the opened-up bottom of the tube as it is carried around with the drum, means for folding over the trailing flap of the opened-up bottom of the tube as it is carried around with the drum after the application of adhesive, and means for folding over the leading flap of the opened-up bottom of the tube as it is carried around with the drum after the folding over of the trailing flap, the means for folding over the trailing flap comprising a creaser blade and a fold-over shovel, said blade having an edge around which the trailing flap is adapted to be folded by said shovel, means mounting said creaser blade for movement away from and back to a retracted position, said creaser blade mounting means comprising an arm pivoted for swinging movement on an axis parallel to the axis of the drum and located radially outward from the drum, means for actuating said blade to move it away from retracted position and bring its edge into engagement with the trailing flap on a line on which the trailing flap is to be folded over, then to move the blade around with the drum and back toward retracted position, means mounting the shovel for swinging movement about the axis of the drum away from and back to a retracted position, and means for actuating the shovel to move it away from retracted position and causing it to enter under the trailing flap and sweep over the blade, thereby to fold over the trailing flap, and then to return the shovel to retracted position.

28. A rotary bottomer as set forth in claim 27 wherein said means for folding over the leading flap comprises a leading flap creaser shovel and a flipper means, said leading flap creaser shovel having an edge around which the leading flap is adapted to be folded by said flipper means, means mounting said leading flap creaser shovel for movement away from and back to a retracted position, means for actuating said leading flap creaser shovel to move it away from retracted position and bring its edge into engagement with the leading flap on a line on which the leading flap is to be folded over and then to move it back to a retracted position, means mounting said flipper means for movement away from and back to a retracted position, and means for actuating the flipper means to move it away from retracted position to position to cause the leading flap to fold back over the edge of the leading flap creaser shovel and then to move it back to retracted position.

References Cited in the file of this patent

UNITED STATES PATENTS

| | | |
|---|---|---|
| 1,953,432 | Potdevin | Apr. 3, 1934 |
| 2,126,920 | Potdevin | Aug. 16, 1938 |
| 2,773,435 | Richens | Dec. 11, 1956 |